(12) United States Patent
Isurugi et al.

(10) Patent No.: US 8,999,133 B2
(45) Date of Patent: Apr. 7, 2015

(54) METHOD FOR FORMING ANODIZED LAYER AND MOLD PRODUCTION METHOD

(75) Inventors: Akinobu Isurugi, Osaka (JP); Kiyoshi Minoura, Osaka (JP); Hidekazu Hayashi, Osaka (JP); Kenichiro Nakamatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 211 days.

(21) Appl. No.: 13/819,547

(22) PCT Filed: Aug. 22, 2011

(86) PCT No.: PCT/JP2011/068839
§ 371 (c)(1),
(2), (4) Date: Feb. 27, 2013

(87) PCT Pub. No.: WO2012/029570
PCT Pub. Date: Mar. 8, 2012

(65) Prior Publication Data
US 2013/0153537 A1    Jun. 20, 2013

(30) Foreign Application Priority Data

Aug. 30, 2010    (JP) .................................. 2010-192843

(51) Int. Cl.
*C25D 11/24*    (2006.01)
*C25F 3/02*    (2006.01)
(Continued)

(52) U.S. Cl.
CPC ................. *C25F 3/02* (2013.01); *B29C 33/424* (2013.01); *B29C 33/56* (2013.01); *C25D 11/024* (2013.01); *C25D 11/24* (2013.01); *C25D 11/12* (2013.01)

(58) Field of Classification Search
USPC .......................................... 205/223, 324, 108
See application file for complete search history.

(56) References Cited

U.S. PATENT DOCUMENTS 6,027,629 A * 2/2000 Hisamoto et al. ............... 205/50
6,359,735 B1   3/2002 Gombert et al.
(Continued)

FOREIGN PATENT DOCUMENTS

JP    62-253797 A    11/1987
JP    06-33262 A    2/1994
(Continued)

OTHER PUBLICATIONS

International Preliminary Report on Patentability dated Mar. 21, 2013.
(Continued)

*Primary Examiner* — Bryan D. Ripa
(74) *Attorney, Agent, or Firm* — Harness, Dickey & Pierce, P.L.C.

(57) ABSTRACT

An anodized layer formation method includes: providing an aluminum film provided on a support or an aluminum base; and forming a porous alumina layer which has minute recessed portions by applying a voltage between an anode which is electrically coupled to a surface of the aluminum film or the aluminum base and a cathode which is provided in an electrolytic solution with the surface of the aluminum film or the aluminum base being in contact with the electrolytic solution. The forming of the porous alumina layer includes increasing the voltage to a target value and, before the voltage is increased to the target value, increasing the voltage to a first peak value which is lower than the target value and thereafter decreasing the voltage to a value which is lower than the first peak value. As such, an anodized layer with reduced variation of recessed portions can be formed.

7 Claims, 19 Drawing Sheets

(51) Int. Cl.
*B29C 33/42* (2006.01)
*B29C 33/56* (2006.01)
*C25D 11/02* (2006.01)
*C25D 11/12* (2006.01)

(56) References Cited

U.S. PATENT DOCUMENTS

| | | | |
|---|---|---|---|
| 2003/0141193 A1* | 7/2003 | Hossick-Schott | 205/104 |
| 2003/0205475 A1 | 11/2003 | Sawitowski | |
| 2007/0159698 A1* | 7/2007 | Taguchi et al. | 359/586 |
| 2007/0289874 A1* | 12/2007 | Masuda et al. | 205/171 |
| 2009/0194914 A1* | 8/2009 | Uozu et al. | 264/496 |
| 2010/0258978 A1 | 10/2010 | Yamada et al. | |
| 2010/0283165 A1 | 11/2010 | Ihara | |
| 2011/0005412 A1 | 1/2011 | Fujii et al. | |

FOREIGN PATENT DOCUMENTS

| | | |
|---|---|---|
| JP | 08-144088 A | 6/1996 |
| JP | 08-260196 | 10/1996 |
| JP | 10324998 A | 12/1998 |
| JP | 2001517319 A | 10/2001 |
| JP | 2003-11099 A | 1/2003 |
| JP | 2003531962 A | 10/2003 |
| JP | 2004-35930 A | 2/2004 |
| JP | 2005-516121 A | 6/2005 |
| JP | 2005156695 A | 6/2005 |
| JP | 2008-38237 A | 2/2008 |
| JP | 2010-168664 A | 8/2010 |
| WO | WO-2006059686 A1 | 6/2006 |
| WO | WO-2008001847 A1 | 1/2008 |
| WO | WO-2009107294 A1 | 9/2009 |
| WO | WO-2010/071055 A1 | 6/2010 |

OTHER PUBLICATIONS

International Search Report PCT/ISA/210 for PCT/JP2011/068839 dated Nov. 22, 2011.

* cited by examiner (a)

(b)

(a)

(b)

(a)

(b)

(a)

(b)

(a)

(b)

(a)

(b)

NUMBER OF CYCLES OF ANODIZATION STEP (a)

(b)

(a)

(b)

(c)

METHOD FOR FORMING ANODIZED LAYER AND MOLD PRODUCTION METHOD

TECHNICAL FIELD

The present invention relates to an anodized layer formation method and a mold manufacturing method. In this specification, the "mold" includes molds that are for use in various processing methods (stamping and casting), and is sometimes referred to as a stamper. The "mold" can also be used for printing (including nanoimprinting).

BACKGROUND ART

When anodization is performed on aluminum, an anodized layer which has a porous alumina layer in its surface is formed. Conventionally, anodization of aluminum has been receiving attention as a simple method for making nanometer-scale micropores (very small recessed portions) in the shape of a circular column in a regular arrangement. A base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the surface of the oxide film. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina layer may constitute an arrangement which has a high regularity (periodicity) under specific conditions, an arrangement with a regularity degraded to some extent depending on the conditions, or an irregular (non-periodic) arrangement.

The voltage during anodization for controlling the thickness of the barrier layer and the interval between adjacent micropores is increased to a predetermined value with an appropriate time change rate (see, for example, Patent Documents 1 to 3). Patent Document 1 discloses that increasing the voltage relatively slowly leads to uniform formation of recessed portions. Patent Document 3 describes applying a voltage at a high frequency in order to increase the advance rate of the depth of the recessed portions.

When anodization is performed, bubbles of hydrogen are generated at a cathode immersed in an electrolytic solution. When the hydrogen bubbles are left without being removed, the working environment deteriorates. Patent Document 4 describes covering the cathode with a mesh cloth which allows passage of hydrogen bubbles to some extent, thereby controlling diffusion of the electrolytic solution.

An anodized layer which has such a porous alumina layer can be used for production of an antireflection element (see Patent Documents 5 to 8). The antireflection element utilizes the principles of a so-called moth-eye structure. A minute uneven pattern in which the interval of recessed portions or raised portions is not more than the wavelength of visible light ($\lambda$=380 nm to 780 nm) is formed over a substrate surface. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented. The two-dimensional size of a raised portion of an uneven pattern which performs an antireflection function is not less than 10 nm and less than 500 nm.

Providing an antireflection element on the surface of a display device for use in TVs, cell phones, etc., or an optical element, such as a camera lens, enables reduction of the surface reflection and increase of the amount of light transmitted therethrough. When light is transmitted through the interface between media of different refractive indices (e.g., when light is incident on the interface between air and glass), the antireflection technique prevents decrease of the amount of transmitted light which may be attributed to, for example, Fresnel reflection, and as a result, the visibility improves. The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

For example, Patent Document 6 discloses a method of producing an antireflection film (antireflection surface) with the use of a stamper which has an anodized porous alumina film over its surface. Patent Document 7 discloses the technique of forming tapered recesses with continuously changing pore diameters by repeating anodization of aluminum and a pore diameter increasing process. Patent Document 8 discloses the technique of forming an antireflection film with the use of an alumina layer in which very small recessed portions have stepped lateral surfaces.

As described in Patent Documents 5, 6, and 8, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 µm and less than 100 µm. The entire disclosures of Patent Documents 5, 6, and 8 are herein incorporated by reference.

Utilizing an anodized porous aluminum film as described above can facilitate the manufacture of a mold which is used for formation of a moth-eye structure over a surface (hereinafter, "moth-eye mold"). In particular, as described in Patent Documents 6 and 8, when the surface of the anodized aluminum film as formed is used as a mold without any modification, the manufacturing cost can be reduced. In this specification, the structure of the surface of a moth-eye mold which is capable of forming a moth-eye structure by means of transfer, for example, is herein referred to as "inverted moth-eye structure".

CITATION LIST

Patent Literature

Patent Document 1: Japanese Laid-Open Patent Publication No. 2008-38237
Patent Document 2: Japanese Laid-Open Patent Publication No. 06-33262
Patent Document 3: Japanese Laid-Open Patent Publication No. 2004-35930
Patent Document 4: Japanese Laid-Open Patent Publication No. 10-324998
Patent Document 5: Japanese PCT National Phase Laid-Open Publication No. 2001-517319
Patent Document 6: Japanese PCT National Phase Laid-Open Publication No. 2003-531962
Patent Document 7: Japanese Laid-Open Patent Publication No. 2005-156695
Patent Document 8: WO 2006/059686

SUMMARY OF INVENTION

Technical Problem

The present inventors conducted intensive researches and, as a result, found that, when anodization is simply performed, a variation occurs in the recessed portions of the anodized layer in some cases. When a variation occurs in the recessed portions, the reflection characteristics of an antireflection element which is produced using the anodized layer also vary. The variation of the recessed portions of the anodized layer is likely to occur particularly when a large-area anodized layer is formed.

The present invention was conceived in view of the above problems. One of the objects of the present invention is to provide a method for forming an anodized layer with reduced variation in the recessed portions.

Solution to Problem

An anodized layer formation method of the present invention is a method for forming an anodized layer, including the steps of: providing an aluminum film provided on a support or an aluminum base; and forming a porous alumina layer which has minute recessed portions by applying a voltage between an anode which is electrically coupled to a surface of the aluminum film or the aluminum base and a cathode which is provided in an electrolytic solution with the surface of the aluminum film or the aluminum base being in contact with the electrolytic solution, wherein the step of forming the porous alumina layer includes increasing the voltage to a target value, and before the voltage is increased to the target value, increasing the voltage to a first peak value which is lower than the target value and thereafter decreasing the voltage to a value which is lower than the first peak value.

In one embodiment, in the step of decreasing the voltage to a value which is lower than the first peak value, the voltage is decreased to substantially zero.

In one embodiment, the step of forming the porous alumina layer further includes, after the step of decreasing the voltage to a value which is lower than the first peak value and before the step of increasing the voltage to the target value, increasing the voltage to a second peak value which is higher than the first peak value and which is equal to or lower than the target value and thereafter decreasing the voltage to a value which is lower than the second peak value.

In one embodiment, in the step of increasing the voltage to the second peak value, the second peak value is generally equal to the target value.

In one embodiment, the anodized layer formation method further includes an etching step after the porous alumina layer is formed, in which the porous alumina layer is brought into contact with an etching solution such that the minute recessed portions are enlarged.

In one embodiment, a time rate change in a voltage in at least a portion of at least one of a period where the voltage is increased to the target value and a period where the voltage is increased to the first peak value is larger than 0.57 V/s and smaller than 20 V/s.

In one embodiment, in the step of providing, the support or the aluminum base has the shape of a generally circular pole.

A method for manufacturing a mold which has an inverted moth-eye structure over its surface according to the present invention includes the step of forming a porous alumina layer which has a plurality of minute recessed portions according to the above-described anodized layer formation method, the minute recessed portions having a two-dimensional size of not less than 10 nm and less than 500 nm when seen in a direction normal to a surface.

An antireflection element production method includes the step of: providing a mold which is manufactured according to the above-described manufacturing method and a work; and irradiating a UV-curable resin provided between the mold and a surface of the work with ultraviolet light supplied through the mold, thereby curing the UV-curable resin.

Advantageous Effects of Invention

According to an anodized layer formation method of the present invention, the variation of the recessed portions can be reduced.

DESCRIPTION OF EMBODIMENTS

Hereinafter, embodiments of an anodized layer formation method and a moth-eye mold manufacturing method according to the present invention will be described with reference to the drawings, although the present invention is not limited to the embodiments which will be described below.

Figure 1:
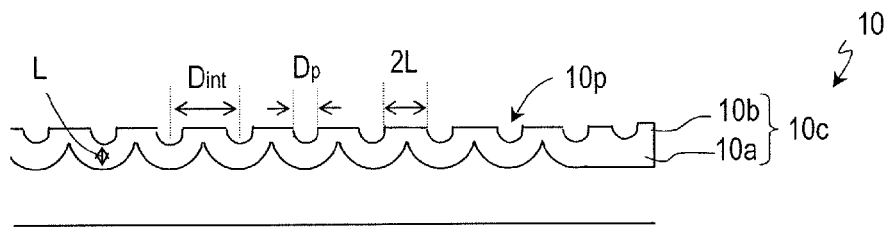
FIG. 1 A schematic diagram of an embodiment of an anodized layer according to the present invention.

FIG. 1 is a schematic diagram of an anodized layer 10 of the present embodiment. The anodized layer 10 includes a porous alumina layer 10c. The porous alumina layer 10c includes a barrier layer 10a and a porous layer 10b. The porous alumina layer 10c is provided at the surface of the anodized layer 10. The porous layer 10b has a plurality of minute recessed portions (micropores) 10p.

In this specification, the average value of the distance between the centers of the minute recessed portions 10p is referred to as "average adjoining distance $D_{int}$" or simply "adjoining distance $D_{int}$". Note that, when the recessed portions 10p is a periodic structure, the adjoining distance $D_{int}$ is also referred to as "pitch". In this specification, the average value of the pore diameter of the recessed portions (micropores) 10p is referred to as "average pore diameter $D_p$" or simply "pore diameter $D_p$". The thickness of the micropore wall is equal to the thickness of the barrier layer 10a, L, and therefore, the average thickness of the entire micropore wall that separates two micropores is represented by 2L. The average adjoining distance $D_{int}$ of the micropores 10p is represented by the sum of the average thickness of the micropore wall, 2L, and the average pore diameter of the micropores, $D_p$.

Figure 2:
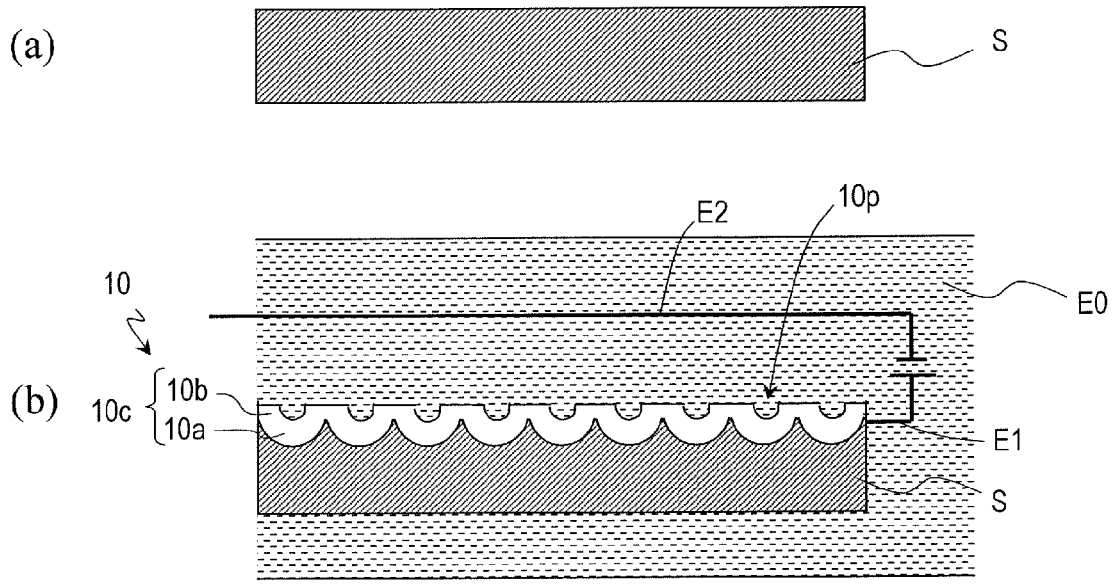
FIG. 2 (a) and (b) are schematic diagrams for illustrating an embodiment of an anodized layer formation method of the present invention.

Hereinafter, a method for forming the anodized layer 10 is described with reference to FIG. 2.

Firstly, a base S is provided as shown in FIG. 2(a). The surface of the base S is made of aluminum. The base S may include a support and an aluminum film provided on the support. The base S may be formed by depositing an aluminum film over the support. For example, the support may be a glass substrate, and the aluminum film may be directly deposited over the glass substrate. The base S may further include another component which is provided between the support and the aluminum film. Alternatively, the base S may be an aluminum base (bulk material of aluminum).

Then, a voltage is applied between an anode E1 which is electrically coupled to the surface of the base S and a cathode E2 which is provided in an electrolytic solution E0 with the surface of the base S being in contact with the electrolytic solution E0 as shown in FIG. 2(b), whereby the anodized layer 10 which has the porous alumina layer 10c, including the barrier layer 10a and the porous layer 10b, is formed. This step is also referred to as "anodization step". The porous alumina layer 10c has minute recessed portions 10p.

In the anodization step, when a voltage is applied, the barrier layer 10a is first formed over the surface of the base S, and recessed and raised portions are formed in that barrier layer 10a. Concentration of the current density occurs in the recessed portions and causes local dissolution so that the recessed portions become deeper. As a result, the porous layer 10b is formed. The electric current that flows is relatively small for the applied voltage, and the resistance is large, so that Joule's heat is generated in the anodization step. The pitch or average adjoining distance of the recessed portions 10p varies depending on the applied voltage.

Hereinafter, the transition of the voltage in the formation method of the anodized layer 10 is described with reference to FIG. 3.

First, the voltage between the anode and the cathode is increased to the peak value, and thereafter, the voltage is decreased from the peak value to a value which is lower than the peak value. For example, by turning off the power supply, the voltage is decreased from the peak value to zero. At this point in time, the barrier layer 10a has a thickness corresponding to the peak value.

Thereafter, the voltage is increased to a target value which is higher than the peak value, and the voltage is maintained at the target value for a predetermined period of time. Thereafter, the voltage is decreased from the target value to zero by, for example, turning off the power supply. As a result, the barrier layer 10a has a thickness corresponding to the target value. Note that this barrier layer 10a has a greater thickness than that achieved before the start of application of the voltage at the target value. Also, the pitch or average adjoining distance of the recessed portions provided in the porous alumina layer 10c of the anodized layer 10 corresponds to the target value.

Here, the time change rate (slope) of the voltage increasing to the peak value or to the target value is constant. The time rate change in the voltage during the increase to the peak value and to the target value is preferably more than 0.57 V/s and less than 20 V/s. The details will be described later.

When the quantity of heat generated per unit time (i.e., electric power) in the anodization step is large, the difference in temperature between different regions of the base S is relatively large, and as a result, formed recessed portions may vary in some cases.

In the present embodiment, before the voltage is increased to the target value, the voltage is increased to the peak value that is lower than the target value, whereby the quantity of heat generated transiently can be efficiently reduced. A barrier layer which is formed by increasing the voltage to the peak value contains alumina which has a high insulating property. To further advance the anodization after that, it is necessary to apply a voltage which is equal to or higher than the peak value. When the applied voltage is lower than the peak value, an electric current rarely flows, and the anodization would not advance. Thus, in increasing the voltage to the target value, the electric current that flows is not so large even when the voltage is changed from zero to the peak value. The electric current that flows when the voltage that has reached the peak value is increased to the target value is smaller than the electric current that flows when the voltage is directly increased to the target value without being increased to the peak value. By increasing the voltage stepwise in this way, the quantity of the electric current can be reduced, and the quantity of heat generated per unit time (i.e., electric power) can be reduced. As a result, the variation of the recessed portions 10p can be reduced.

In the present embodiment, the electric current that flows when the voltage is increased to the peak value that is lower than the target value is smaller than the electric current that flows when the voltage is increased to the target value, so that the quantity of generated Joule's heat is relatively small. Thereafter, by increasing the voltage to the peak value and then decreasing the voltage to a level which is lower than the peak value, the electric current would not flow at least transiently, so that generation of Joule's heat stops. Therefore, heat generated when the voltage is increased to the peak value diffuses, so that the influence of the heat generated when the voltage is increased to the peak value can be reduced. Thus, according to the anodized layer formation method of the present embodiment, the difference in temperature between different regions of the base S can be reduced, and as a result, the variation of the recessed portions can be reduced.

In the above description, the voltage is increased to the peak value, and thereafter, the voltage is decreased from the peak value to zero, although the present invention is not limited to this example. Even if the voltage is not decreased to zero, the electric current flow is stopped at least transiently by decreasing the voltage to a level lower than the peak value, whereby the influence of the heat generated when the voltage is increased to the peak value can be reduced. However, even when the voltage is lower than the peak value, an electric current can flow in some cases due to a variation of the base S. Thus, the electric current which flows due to a variation can be effectively reduced by decreasing the voltage to zero.

Figure 3:
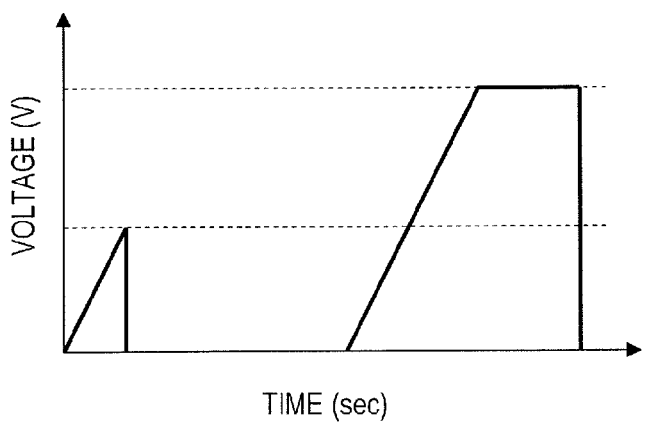
FIG. 3 A graph which shows the transition of the voltage in an embodiment of the anodized layer formation method of the present invention.

In FIG. 3, the increase and decrease of the voltage is caused once before the voltage is increased to the target value, although the present invention is not limited to this example. The increase and decrease of the voltage may be caused twice or more before the voltage is increased to the target value.

Hereinafter, the transition of the voltage in the formation method of the anodized layer 10 is described with reference to FIG. 4.

First, the voltage between the anode and the cathode is increased to the first peak value, and thereafter, the voltage is decreased from the first peak value to a value which is lower than the first peak value. For example, by turning off the power supply, the voltage is decreased from the first peak value to zero. At this point in time, the barrier layer 10a has a thickness corresponding to the first peak value.

Then, the voltage between the anode and the cathode is increased to the second peak value that is higher than the first peak value, and thereafter, the voltage is decreased from the second peak value to a value which is lower than the second peak value. For example, by turning off the power supply, the voltage is decreased from the second peak value to zero. At this point in time, the barrier layer 10a has a thickness corresponding to the second peak value. Note that the thickness of the barrier layer 10a at this point in time is greater than that achieved before the increase of the voltage to the second peak value is started.

Thereafter, the voltage is increased to a target value which is equal to or higher than the second peak value, and the voltage is maintained at the target value for a predetermined period of time. Thereafter, the voltage is decreased from the target value to zero by, for example, turning off the power supply. At this point in time, the barrier layer 10a has a thickness corresponding to the target value. Also, the pitch or average adjoining distance of the recessed portions is a predetermined length.

Here, the time change rate (slope) of the voltage increasing to the peak value or to the target value is constant. The time rate change in the voltage during the increase to the first peak value, to the second peak value, and to the target value is preferably more than 0.57 V/s and less than 20 V/s. The details will be described later. Note that when the second peak value is equal to the target value, the pitch or adjoining distance of recessed portions formed at the time of increasing the voltage to the second peak value is generally equal to the pitch or average adjoining distance which is subsequently achieved at the voltage of the target value. Therefore, recessed portions of a predetermined depth can be efficiently formed with a predetermined pitch or adjoining distance.

In the present embodiment, the voltage is increased to the first peak value that is lower than the target value (and to the second peak value when necessary) before the voltage is increased to the target value, so that the quantity of transiently-generated heat can be efficiently reduced.

Specifically, a barrier layer which is formed by increasing the voltage to the first peak value contains alumina which has a high insulating property. To further advance the anodization after that, it is necessary to apply a voltage which is equal to or higher than the first peak value. When the applied voltage is lower than the first peak value, an electric current rarely flows. Thus, in subsequently increasing the voltage to the second peak value that is higher than the first peak value, the electric current that flows is not so large even when the voltage is changed from zero to the first peak value. The electric current that flows when the voltage that has reached the first peak value is increased to the second peak value is smaller than the electric current that flows when the voltage is directly increased to the second peak value without being increased to the first peak value. By increasing the peak value of the voltage stepwise in this way, the quantity of the electric current can be reduced, and the quantity of heat generated per unit time (i.e., electric power) can be reduced. As a result, the variation of the recessed portions can be reduced.

Likewise, a barrier layer which is formed by increasing the voltage to the second peak value contains alumina which has a high insulating property. To further advance the anodization after that, it is necessary to apply a voltage which is equal to or higher than the second peak value. When the applied voltage is lower than the second peak value, an electric current rarely flows. Thus, in increasing the voltage to the target value, the electric current that flows is not so large even when the voltage is changed from zero to the second peak value. The electric current that flows after the voltage has reached the second peak value is smaller than the electric current that flows when the voltage is increased to the target value without being increased to the second peak value. By increasing the peak value of the voltage stepwise in this way, the quantity of the electric current can be reduced, and the quantity of heat generated per unit time (i.e., electric power) can be reduced. As a result, the variation of the recessed portions can be reduced.

In the present embodiment, the electric current that flows when the voltage is increased to the peak value that is lower than the target value is smaller than the electric current that flows when the voltage is increased to the target value, so that the quantity of generated Joule's heat is relatively small. Thereafter, by increasing the voltage to the peak value and then decreasing the voltage to a level which is lower than the peak value, the electric current would not flow at least transiently, so that formation of the anodized layer is stopped, and generation of heat stops. Therefore, heat generated when the voltage is increased to the first peak value or to the second peak value diffuses, so that the influence of the heat generated when the voltage is increased to the first peak value or to the second peak value can be reduced. As described hereinabove, according to the anodized layer formation method of the present embodiment, a plurality of pulses are applied in such a manner that the peak value of each pulse is not less than the peak value of the previous pulse. As a result, the variation of the recessed portions can be reduced.

In the above description, the voltage is increased to the first peak value or to the second peak value, and thereafter, the voltage is decreased to zero, although the present invention is not limited to this example. Even if the voltage is not decreased to zero, the electric current flow is stopped at least transiently by decreasing the voltage to a level lower than the first peak value or than the second peak value, whereby the influence of the heat generated when the voltage is increased to the first peak value or to the second peak value can be reduced. However, even when the voltage is lower than the first peak value or than the second peak value, an electric current can flow in some cases due to a variation of the base S. Thus, the electric current which flows due to a variation can be effectively reduced by decreasing the voltage to zero.

Figure 4:
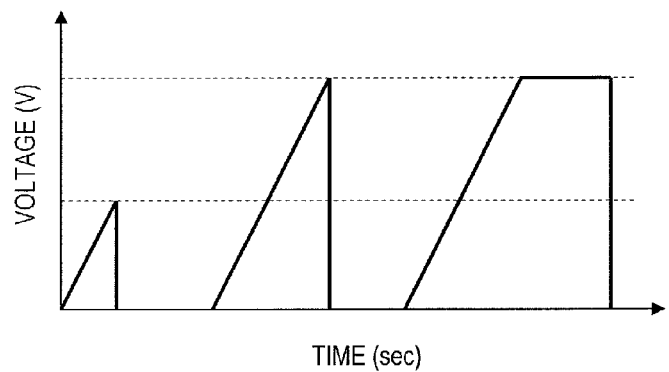
FIG. 4 A graph which shows the transition of the voltage in another embodiment of the anodized layer formation method of the present invention.

In FIG. 4, the increase and decrease of the voltage is caused twice before the voltage is increased to the target value. However, the increase and decrease of the voltage may be caused three or more times before the voltage is increased to the target value. The thus-formed anodized layer 10 is suitably used in manufacture of a moth-eye mold.

Figure 5:
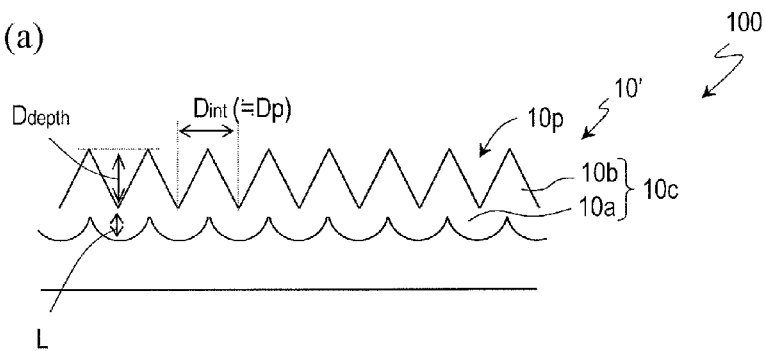
FIG. 5 (a) is a schematic cross-sectional view of an embodiment of a moth-eye mold of the present invention. (b) is a schematic top view of the moth-eye mold shown in (a).
Figure 5:
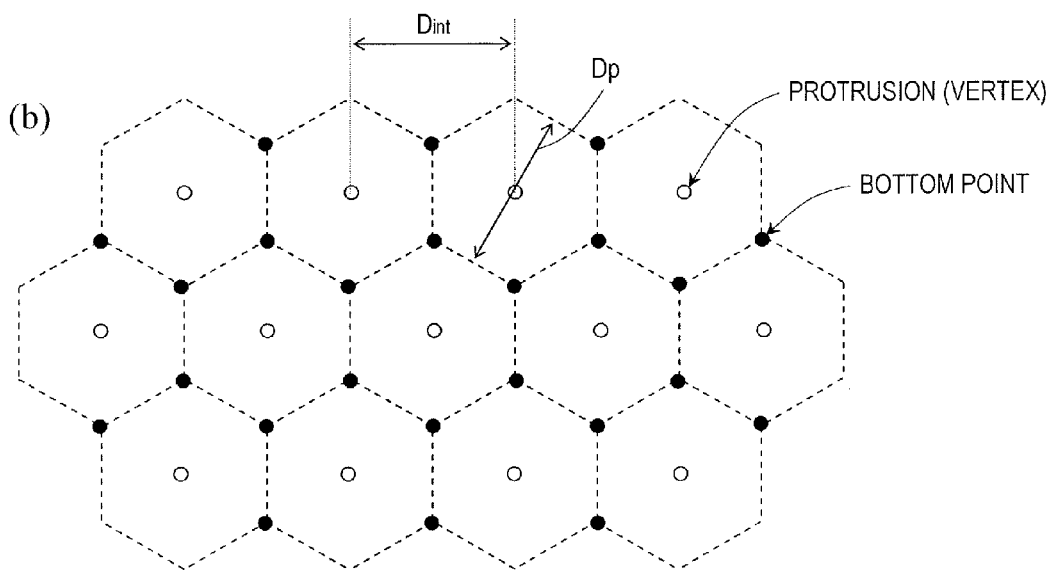

Hereinafter, a moth-eye mold of the present embodiment is described with reference to FIG. 5. FIG. 5(a) is a schematic cross-sectional view of a moth-eye mold 100. FIG. 5(b) is a schematic top view of the moth-eye mold 100. The moth-eye mold 100 includes an anodized layer 10' which is realized by the anodized layer 10 shown in FIG. 1 and FIG. 2.

In the anodized layer 10', the porous alumina layer 10c has a plurality of minute recessed portions 10p, by which an inverted moth-eye structure is realized. The minute recessed portions 10p preferably have a two-dimensional size (opening diameter: $D_p$) of not less than 10 nm and less than 500 nm, and a depth ($D_{depth}$) of approximately not less than 10 nm and less than 1000 nm (1 μm). The pitch or average adjoining distance $D_{int}$ of the recessed portions 10p (the distance between the centers of adjoining recessed portions) is not less than 10 nm and less than 500 nm.

It is preferred that the bottom portion of the minute recessed portions 10p is tapered (with the deepest part of the bottom portion being pointed). Further, it is preferred that the minute recessed portions 10p are in a closely packed arrangement. Assuming that the shape of the minute recessed portions 10p when viewed in a direction normal to the anodized layer 10' is a circle, it is preferred that adjacent circles overlap each other, and a saddle portion is formed between adjacent ones of the minute recessed portions 10p. Note that, when the generally-conical minute recessed portions 10p adjoin one another so as to form saddle portions, the two-dimensional size of the minute recessed portions 10p, $D_p$, is equal to the average adjoining distance $D_{int}$ (the distance between the centers of adjoining recessed portions). Thus, the porous alumina layer 10c of the moth-eye mold 100 that is for formation of the antireflection element preferably has a configuration in which the minute recessed portions 10p are in an irregular closely-packed arrangement, the minute recessed portions 10p having such dimensions that $D_p$ and $D_{int}$ are each not less than 10 nm and less than 500 nm and $D_{depth}$ is generally not less than 10 nm and less than 1000 nm (1 μm). The thickness of the porous alumina layer 10c is generally not more than 1 μm.

Figure 6:
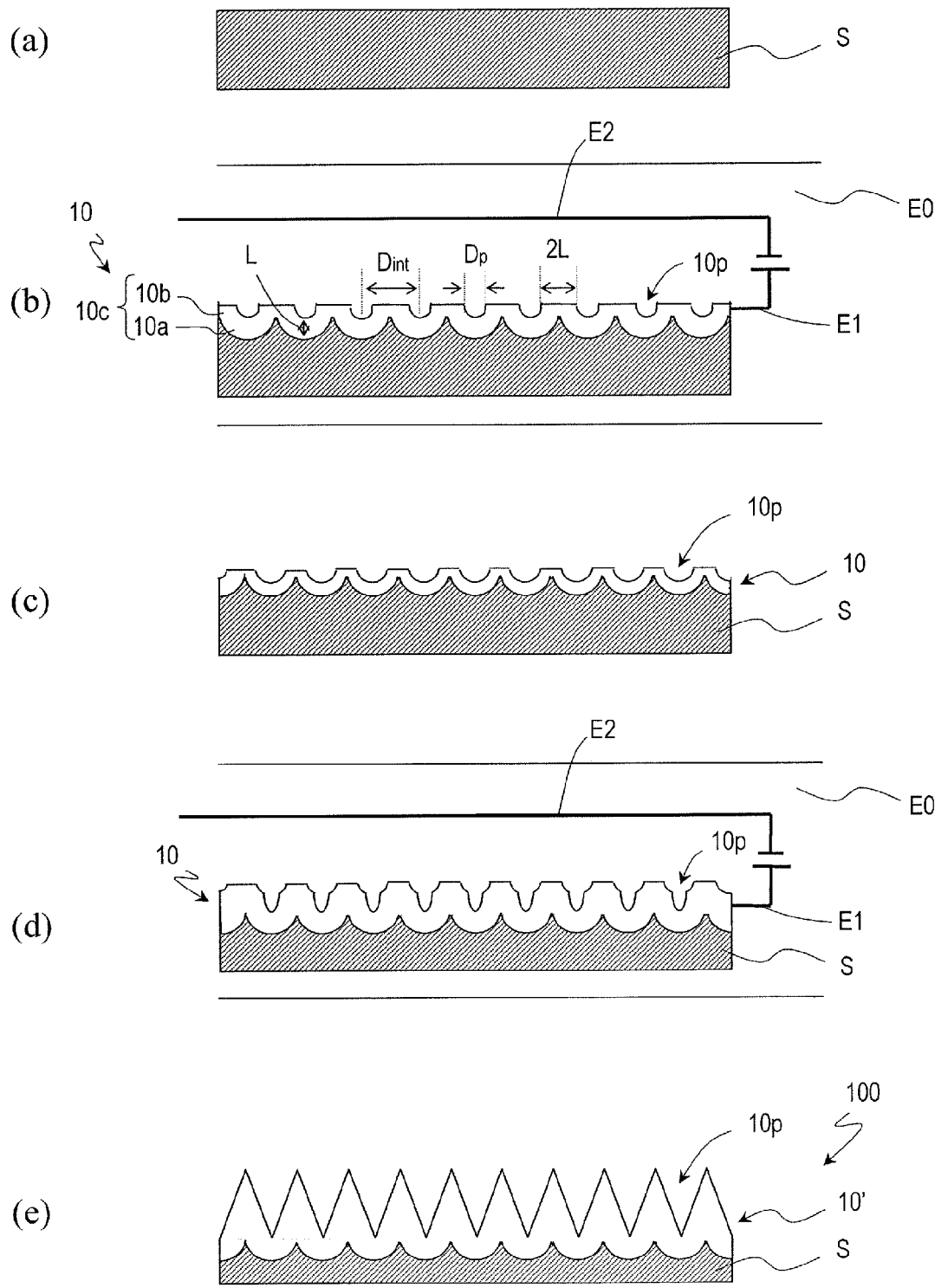
FIG. 6 (a) to (e) are schematic diagrams for illustrating an embodiment of a moth-eye mold manufacturing method of the present invention.

Hereinafter, a method for manufacturing the moth-eye mold 100 is described with reference to FIG. 6.

First, a mold base S is provided as shown in FIG. 6(a). The surface of the mold base S is made of aluminum. The mold base S may include a support and an aluminum film which is provided on the support. Alternatively, the mold base S may be an aluminum base.

Next, a voltage is applied between an anode E1 that is electrically coupled to the surface of the mold base S and a cathode E2 that is provided in an electrolytic solution E0 with the surface of the mold base S being in contact with the electrolytic solution E0, whereby a porous alumina layer 10c which has minute recessed portions is formed as shown in FIG. 6(b). In this anodization step, the increase and decrease of the voltage is caused at least once before the voltage is increased to the target value as previously described with reference to FIG. 3 or FIG. 4. The target value is set according to the pitch or average adjoining distance of the recessed portions in the anodized layer 10'.

Then, after formation of the porous alumina layer 10c, the porous alumina layer 10c is brought into contact with an etching solution, whereby the minute recessed portions are enlarged, and the lateral surfaces of the minute recessed portions are sloped as shown in FIG. 6(c). Such a step is also referred to as "etching step".

Thereafter, when necessary, anodization may be performed again as shown in FIG. 6(d). In the second and subsequent cycles of the anodization step which are performed after the etching step, an electric current cannot flow without application of a somewhat high voltage because the porous alumina layer 10c has been formed over the surface of the mold base S. Here, the voltage is increased to a value which is equal to the target value that will be reached later for anodization.

Thereafter, when necessary, the etching step is performed as shown in FIG. 6(e). Further, another cycle of the anodization step may be performed. Note that when the anodization step and the etching step are repeatedly performed (i.e., when the anodization step is performed at least twice), it is preferred that the anodization is performed at the end. In the anodized layer 10', the recessed portions 10p have such a shape that a deeper portion is narrower. In this way, the moth-eye mold 100 is manufactured which includes the anodized layer 10' which has an inverted moth-eye structure.

When the anodization step is performed through a plurality of cycles, the voltage in the first cycle of the anodization step is applied as previously described with reference to FIG. 3 or FIG. 4. When the voltage is relatively slowly increased to the peak value or to the target value, recessed portions (micropores) can be formed in the barrier layer according to the voltage before the peak value or the target value is reached in some cases. Particularly when the time rate change in the voltage is relatively small in the anodization step, recessed portions whose adjoining distance is shorter than a predetermined adjoining distance can be formed in the barrier layer in some cases. Such recessed portions with a short adjoining distance frequently occur in a shallow portion of the porous alumina layer. However, such recessed portions with a short adjoining distance are efficiently removed in the etching step.

The moth-eye mold 100 is suitably used for production of an antireflection element. While the details will be described later, as for a commonly-employed moth-eye mold, particularly when the area of the moth-eye mold is large, the average height of raised portions relatively largely varies among a plurality of different regions of the moth-eye mold, and as a result, the antireflection characteristics sometimes vary among the regions. On the other hand, in the moth-eye mold 100 of the present embodiment, the variation of the recessed portions 10p among a plurality of different regions can be reduced. As a result, the variation in the antireflection characteristics of an antireflection element which is produced using the moth-eye mold 100 can be reduced.

Figure 7:
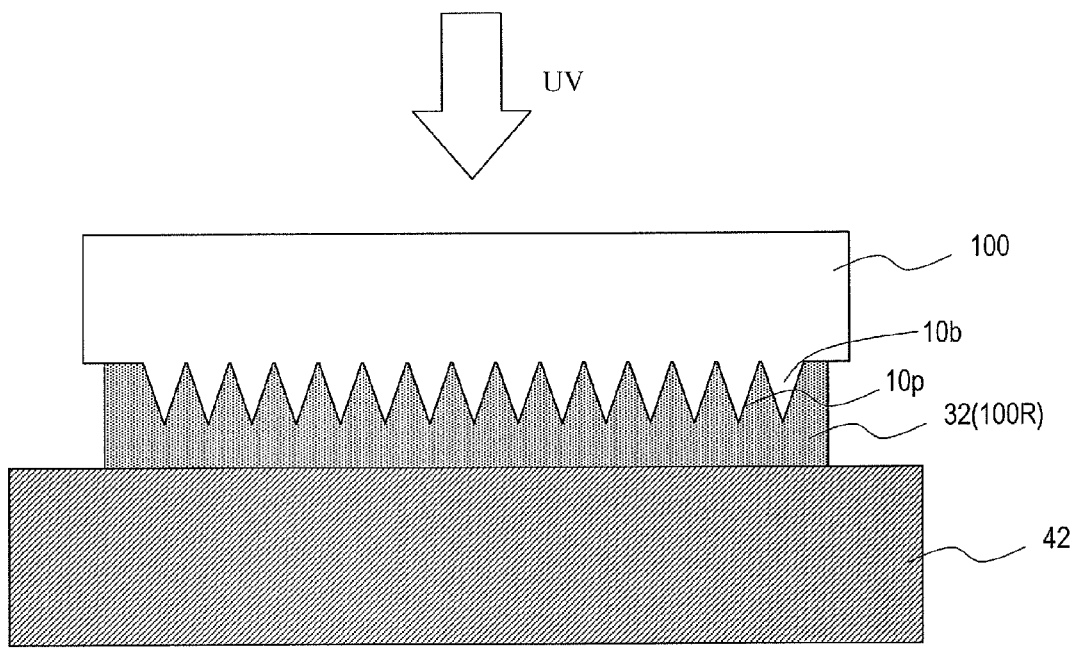
FIG. 7 A schematic diagram for illustrating production of an antireflection element with the use of a moth-eye mold of the present embodiment.

Next, an antireflection element production method with the use of the moth-eye mold 100 is described with reference to FIG. 7. A UV-curable resin 32, which is provided between a surface of a work 42 and the mold 100, is irradiated with ultraviolet (UV) light via the mold 100 such that the UV-curable resin 32 is cured. The UV-curable resin 32 may be provided over the surface of the work 42 or may be provided over a mold surface of the mold 100 (a surface of the mold 100 which has the moth-eye structure). The UV-curable resin used may be, for example, an acrylic resin.

Thereafter, the moth-eye mold 100 is separated from the work 42, whereby a cured material layer of the UV-curable resin 32, to which the uneven structure of the moth-eye mold 100 is transferred, is formed over the surface of the work 42. In this way, by transferring the inverted moth-eye structure of the moth-eye mold 100 to a photocurable resin, an antireflection element 100R is produced which has a moth-eye structure that is formed by transfer of the inverted moth-eye structure of the moth-eye mold 100. The raised portions of the antireflection element 100R are formed corresponding to the micropores (minute recessed portions) of the moth-eye mold 100.

The raised portions of the moth-eye structure preferably have a base whose diameter is not less than 10 nm and less than 500 nm. Further, when the raised portions have a conical shape, the antireflection effect can be improved. The raised portions are preferably arranged so as to have no periodicity for the purpose of preventing occurrence of unnecessary diffracted light. Here, "having no periodicity" means that, for example, the distance between the vertex of a certain one of a plurality of raised portions and the vertex of a raised portion which is closest to the vertex of the certain raised portion is different from the distance between the vertex of another certain one of the plurality of raised portions and the vertex of still another one of the raised portions which is closest to the vertex of the another certain raised portion. As for the meaning of "having no periodicity", for example, when the total sum of the vectors extending from the barycenter of a certain one of the micropores to the barycenters of all the micropores that are adjacent to the certain micropore is not less than 5% of the total length of the vectors, it can be said that the arrangement of the micropores has no periodicity.

The moth-eye mold 100 may have the shape of a generally flat plate but preferably has the shape of a generally circular pole. In this case, the antireflection element 100R can be conveniently produced by performing the transfer using the moth-eye mold 100 according to a roll-to-roll method.

Figure 8:
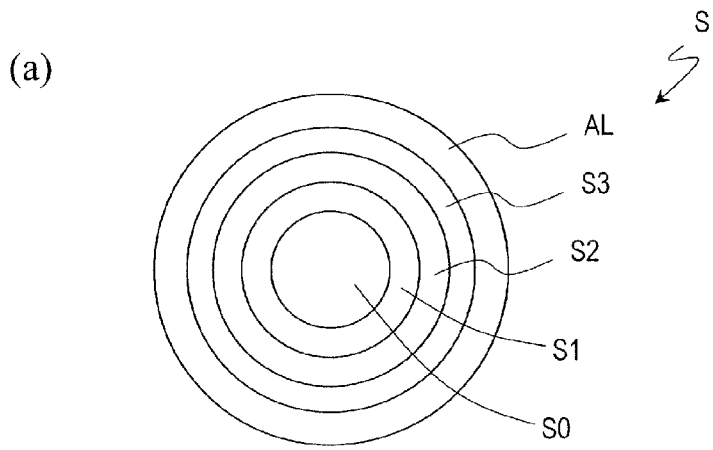
FIG. 8 (a) is a schematic cross-sectional view of a mold base for use in manufacture of a moth-eye mold of the present embodiment. (b) is a schematic diagram of the mold base shown in (a).
Figure 8:
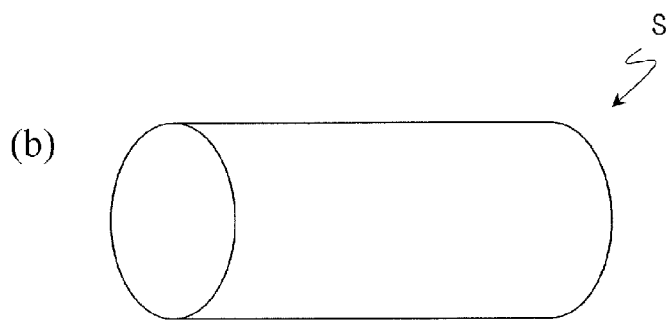

Hereinafter, the mold base S for use in manufacture of the moth-eye mold 100 is described with reference to FIG. 8. FIG. 8(a) is a schematic cross-sectional view of the mold base S. FIG. 8(b) is a schematic diagram of the mold base S. The mold base S has the shape of a generally circular pole. For example, the diameter of the mold base S is about 300 mm, and the length of the mold base S is not less than 1000 mm and not more than 1600 mm.

The mold base S includes components provided between a support S0 and an aluminum film AL. Specifically, the mold base S includes the support S0 which has the shape of a generally circular pole, an insulating layer S1 covering the support S0, an inorganic underlayer S2 covering the insulating layer S1, a buffer layer S3 covering the inorganic underlayer S2, and the aluminum film AL covering the buffer layer S3.

The mold base S having such a configuration can be prepared as described below. First, a support S0 which has the shape of a generally circular pole is provided. The support S0 is preferably a seamless support. The support S0 is made of, for example, nickel. Such a support S0 is also referred to as nickel sleeve.

Then, an insulating layer S1 is formed on the outer perimeter surface of the support S0. The insulating layer S1 may be, for example, an organic insulating layer. As the material of the organic insulating layer, for example, a resin may be used. For example, a curable resin is applied over the outer perimeter surface of the support S0 to form a curable resin layer, and thereafter, the curable resin is cured, whereby the organic insulating layer is formed on the outer perimeter surface of the support S0.

The curable resin layer may be formed by means of electrodeposition, for example. The electrodeposition may be, for example, a known electrodeposition painting method. For example, the support S0 is washed, and then, the support S0 is immersed in an electrodeposition bath in which an electrodeposition solution that contains an electrodeposition resin is stored. In the electrodeposition bath, an electrode is installed. For example, when the curable resin layer is formed by means of cationic electrodeposition, an electric current is allowed to flow between the support 12 and the anode, where the support 12 serves as the cathode and the electrode installed in the electrodeposition bath serves as the anode, so that the electrodeposition resin is deposited on the outer perimeter surface of the support 12, whereby the curable resin layer is formed. When the curable resin layer is formed by means of anionic electrodeposition, an electric current is allowed to flow, where the support S0 serves as the anode and the electrode installed in the electrodeposition bath serves as the cathode, whereby the curable resin layer is formed. Thereafter, the washing step and the baking step are performed, whereby an organic insulating layer is formed. The electrodeposition resin used may be, for example, a polyimide resin, an epoxy resin, an acrylic resin, a melamine resin, a urethane resin, or a mixture thereof.

A method for forming the curable resin layer other than the electrodeposition is, for example, spray painting. The curable resin layer may be formed on the outer perimeter surface of the support S0 using, for example, a urethane resin or a polyamic acid according to a spray coating method or an electrostatic painting method. The urethane resin may be, for example, an UreTop product manufactured by Nippon Paint Co., Ltd.

The other examples than those described above include a dip coating method and a roll coating method. For example, when the curable resin is a thermosetting polyamic acid, the organic insulating layer is formed by applying the polyamic acid according to a dip coating method to form a curable resin layer and then heating the polyamic acid to about 300° C. The polyamic acid is available from, for example, Hitachi Chemical Company, Ltd.

Providing the insulating layer S1 on the outer perimeter surface of the support S0 realizes insulation of the aluminum film AL from the support S0. If the insulation between the support and the aluminum film is insufficient, a local cell reaction would occur between the support and the aluminum film in a subsequent etching step which is performed on the aluminum film. In this case, recesses with a diameter of about 1 μm can be formed in the aluminum film in some cases. Using such a moth-eye mold that has relatively-large recesses leads to a failure to produce an antireflection film which has a desired moth-eye structure. Also, if the insulation between the support and the aluminum film is insufficient, an electric current would sometimes flow through the support in the anodization step which is to be subsequently performed. This electric current flowing through the support means that there is an excessive current flow in the entire base that includes the support and the aluminum film. Therefore, this is not desired from the viewpoint of safety. However, providing the insulating layer S1 enables to prevent occurrence of a local cell reaction in the etching step such as described above and reduce the excessive current flow in the anodization step.

The insulating layer 16 may be an inorganic insulating layer. The material of the inorganic insulating layer may be, for example, $SiO_2$ or $Ta_2O_5$. However, the organic insulating layer realizes a higher specularity in the surface of the aluminum film AL that is formed on the insulating layer than the inorganic insulating layer. Alternatively, even in the case where an inorganic insulating layer is provided, by making the specularity of the surface of the support S0 high, the specularity of the surface of the aluminum film AL formed on the inorganic insulating layer can be high. When the specularity of the surface of the aluminum film formed on the insulating layer is high, the flatness of the surface of a porous alumina layer that is to be formed later is also high. A moth-eye mold in which the flatness of the surface of the porous alumina layer is high is suitably used in manufacture of a moth-eye mold that is for use in formation of a clear-type antireflection structure, for example. Note that the clear-type antireflection structure refers to an antireflection structure which does not have an antiglare function.

Then, an inorganic underlayer S2 is formed on an outer perimeter surface of the insulating layer S. The inorganic underlayer S2 may be formed by sputtering. For example, the inorganic underlayer S2 may be formed by DC reactive sputtering or RF sputtering. The inorganic underlayer S2 may be formed by deposition while rotating the support S0 which has the insulating layer S1 formed over its outer perimeter surface, for example.

Providing the inorganic underlayer S2 can improve the adhesion between the organic insulating layer and the aluminum film AL. The inorganic underlayer S2 contains an inorganic oxide. The inorganic oxide layer is preferably a silicon oxide layer or a titanium oxide layer, for example. Alternatively, an inorganic nitride layer may be formed as the inorganic underlayer S2. The inorganic nitride layer is preferably a silicon nitride layer, for example.

On the inorganic underlayer S2, the buffer layer S3 which contains aluminum is formed. The buffer layer S3 functions to improve the adhesive property between the inorganic underlayer S2 and the aluminum film AL. Also, the buffer layer S3 protects the inorganic underlayer S2 from acid. The buffer layer S3 preferably contains aluminum and oxygen or nitrogen. Although the content of oxygen or nitrogen may be constant, it is particularly preferred that the buffer layer has a profile such that the aluminum content is higher on the aluminum film AL side than on the inorganic underlayer S2 side.

The buffer layer S3 may be formed by, for example, using any of the three methods (1) to (3) described below. Whichever of these methods is employed, the buffer layer S3 may be formed by sputtering while rotating the support S0 which has the inorganic underlayer S2 formed over its outer perimeter surface, for example.

(1) The buffer layer S3 is formed by reactive sputtering with the use of a mixture gas of Ar gas and $O_2$ gas and an Al target which contains the oxygen element. Here, the oxygen content in the target is preferably not less than 1 at % and not more than 40 at %.

(2) The buffer layer S3 is formed by reactive sputtering with the use of a pure Ar gas as the sputtering gas and an Al target which contains the oxygen element. Here, the oxygen content in the target is preferably not less than 5 at % and not more than 60 at %.

(3) The buffer layer S3 is formed by reactive sputtering with the use of a pure aluminum target. Here, the flow rate ratio of the Ar gas and the $O_2$ gas of the mixture gas used in the sputtering is, approximately, more than 2:0 and not more than 2:1.

Then, an aluminum film AL is formed on the buffer layer S3. The thickness of the aluminum film AL is about 1 μm. The aluminum film AL can be formed by, for example, depositing aluminum while rotating the support S0 which has the buffer layer S3 formed on its outer perimeter surface. As described hereinabove, the mold base S which has the shape of a generally circular pole is formed.

Anodization is performed on the thus-formed mold base S. The anodization is carried out in an anodization bath.

Figure 9:
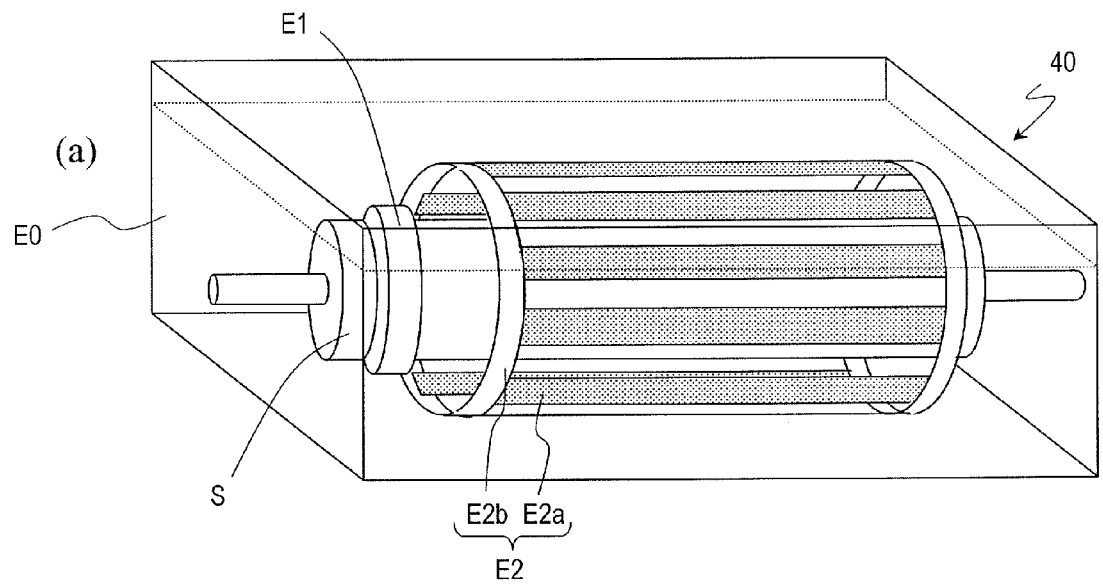
FIG. 9 (a) is a schematic diagram of an anodization bath in which anodization of the moth-eye mold shown in FIG. 8 is performed. (b) is a schematic cross-sectional view of a mold base immersed in an electrolytic solution of the anodization bath of (a).
Figure 9:
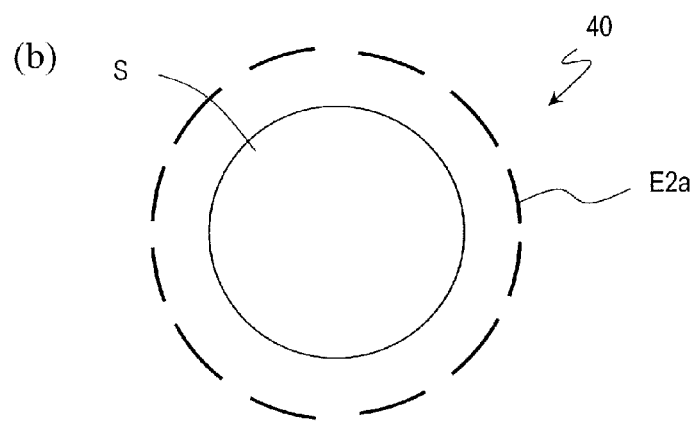

Hereinafter, an anodization bath 40 is described with reference to FIG. 9. FIG. 9(a) is a schematic diagram of the anodization bath 40 where the mold base S is immersed in the electrolytic solution E0. FIG. 9(b) is a schematic cross-sectional view of the mold base S immersed in the electrolytic solution E0 of the anodization bath 40. The anodization bath 40 contains the electrolytic solution E0, and the amount of the electrolytic solution E0 is 4000 L (liter). The mold base S is immersed such that the generating line of the mold base S is parallel to the interface of the electrolytic solution E0 in the anodization bath 40.

The anode E1 is electrically coupled with the aluminum film AL. The cathode E2 is immersed in the electrolytic solution E0 contained in the anodization bath 40. The cathode E2 includes a plurality of linear portions E2a and connecting portions E2b which are in contact with opposite ends of the plurality of linear portions E2a. The linear portions E2a are concentrically arranged such that the shortest distance between the linear portions E2a and the mold base S which has the shape of a generally circular pole is generally constant. The shortest distance between the linear portions E2a and the mold base S is approximately 5 cm. Note that the shortest distance between the mold base S and the connecting portions E2b is longer than the shortest distance between the mold base S and the linear portions E2a.

Here, the cathode E2 includes twelve linear portions E2a. Each of the linear portions E2a and the connecting portions E2b is covered with a cloth. With such masking, nonuniformity in the flow of the electrolytic solution E0 which is attributed to hydrogen bubbles generated at the cathode E2 can be reduced. The details will be described later.

Figure 10:
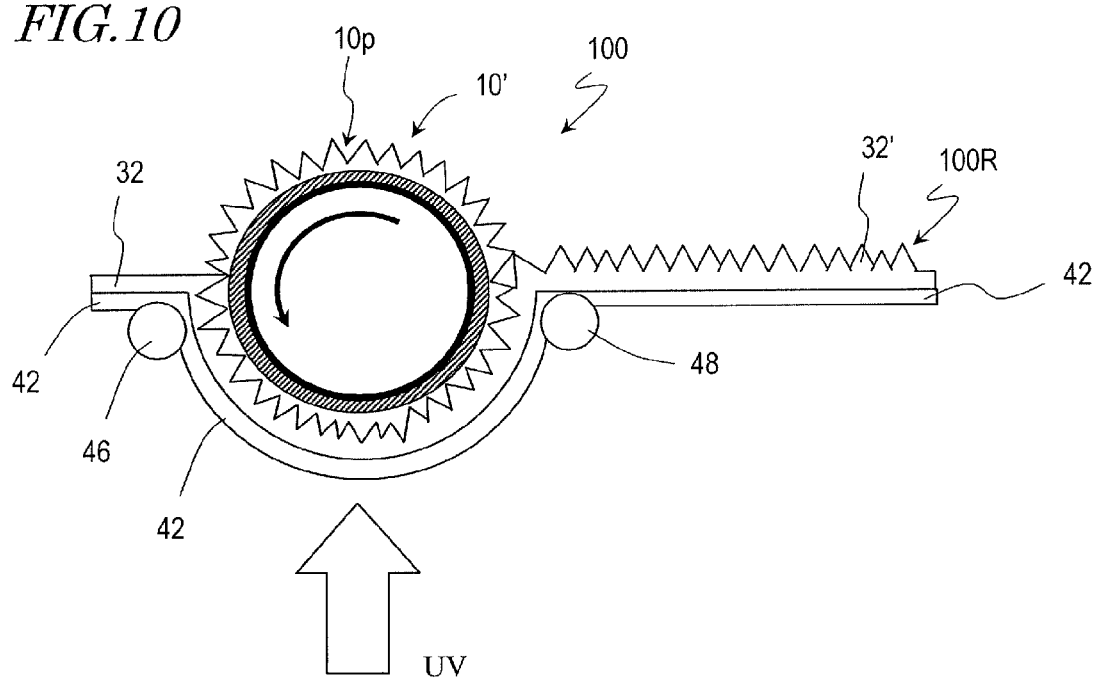
FIG. 10 A schematic diagram for illustrating the process of forming an antireflection element with the use of a moth-eye mold in the form of a circular column according to the present embodiment.

Hereinafter, a method for producing an antireflection element according to a roll-to-roll method is described with reference to FIG. 10.

Then, a work 42 over which a UV-curable resin 32 is applied on its surface is maintained pressed against the moth-eye mold 100, and the UV-curable resin 32 is irradiated with ultraviolet (UV) light such that the UV-curable resin 32 is cured. The UV-curable resin 32 used is, for example, an acrylic resin. The work 42 may be, for example, a TAC (triacetyl cellulose) film. The work 42 is fed from an unshown feeder roller, and thereafter, the UV-curable resin is applied over the surface of the work 42 using, for example, a slit coater or the like. The work 42 is supported by supporting rollers 46 and 48 as shown in FIG. 10. The supporting rollers 46 and 48 have rotation mechanisms for carrying the work 42. The moth-eye mold 100 which has the shape of a generally circular pole is rotated at a rotation speed corresponding to the carrying speed of the work 42 in a direction indicated by the arrow in FIG. 10.

Thereafter, the moth-eye mold 100 is separated from the work 42, whereby a cured material layer 32' to which an uneven structure of the moth-eye mold 100 (inverted moth-eye structure) is transferred is formed on the surface of the work 42. The work 42 which has the cured material layer 32' formed on the surface is wound up by an unshown winding roller. When the moth-eye mold 100 has the shape of a generally circular pole as described herein, the transfer can be realized according to a roll-to-roll method, and mass production of the antireflection element 100R can be conveniently carried out.

As described above, according to the anodized layer formation method of the present embodiment, the variation of the recessed portions can be reduced. Thus, in a moth-eye mold which is formed by such an anodized layer, the variation of the recessed portions can also be reduced. The variation of raised portions of an antireflection element is reduced, and as a result, the variation of the reflection characteristics can be reduced.

Now, a reflection characteristic which depends on the average height of raised portions of an antireflection element is described with reference to FIG. 11.

Figure 11:
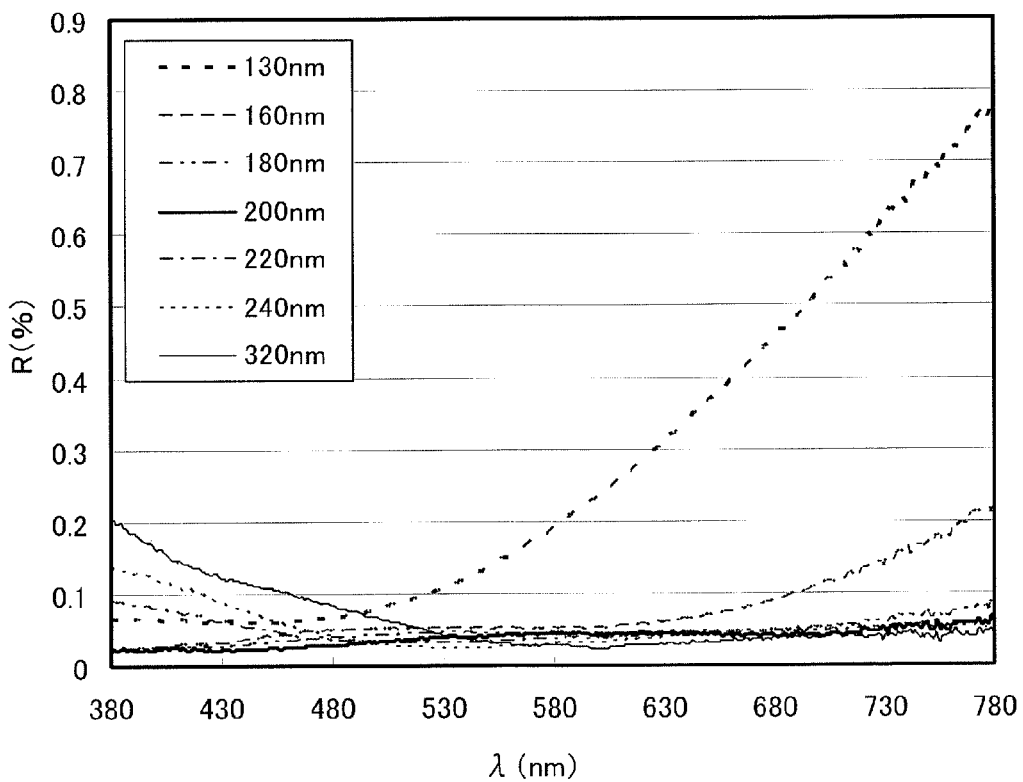
FIG. 11 A graph showing the reflectance with respect to the average height of raised portions of an antireflection element.

FIG. 11 shows the wavelength dependence of the reflectances for different raised portion heights in antireflection elements. The reflectances were obtained by measurement of five-degree regular reflection. Here, the average heights of the raised portions in the antireflection elements were 130 nm, 160 nm, 180 nm, 200 nm, 220 nm, 240 nm, and 320 nm. The pitch or average adjoining distance of the raised portions was 200 nm.

When the average height of the raised portions is 160 nm, the reflectance increases at relatively long wavelengths, and this antireflection element appears to have a red hue. When the average height of the raised portions is 130 nm, the reflectance further increases at relatively high wavelengths, and the antireflection element appears to have a redder hue.

When the average height of the raised portions is 240 nm, the reflectance increases at relatively short wavelengths, and this antireflection element appears to have a blue hue. When the average height of the raised portions is 320 nm, the reflectance further increases at relatively low wavelengths, and the antireflection element appears to have a bluer hue.

The reflectance of the antireflection element is preferably not more than 0.1 over the entire wavelength range of 380 nm to 780 nm. Here, when the average height of the raised portions is 180 nm, 200 nm, or 220 nm, the reflectance is not more than 0.1 over the entire wavelength range of 380 nm to 780 nm. Even when the average height of the raised portions varies by about 10% for 200 nm, the variation of the reflectance is relatively small. However, when the average height varies by 20% or more, the reflectance changes relatively largely. Since the reflectance characteristic largely changes when the average height of the raised portions varies by 20% or more, the variation of the average height of the raised portions in the antireflection element is preferably less than 20%.

Hereinafter, the advantages of a moth-eye mold manufacturing method including the anodized layer formation method of the present embodiment and an antireflection element which was produced using a moth-eye mold which was manufactured by the manufacturing method are described in comparison with a moth-eye mold manufacturing method including the anodized layer formation methods of Comparative Example 1 and 2 and an antireflection element which was produced using a moth-eye mold which was manufactured by the manufacturing method.

First, a moth-eye mold manufacturing method of Comparative Example 1 is described.

Figure 12:
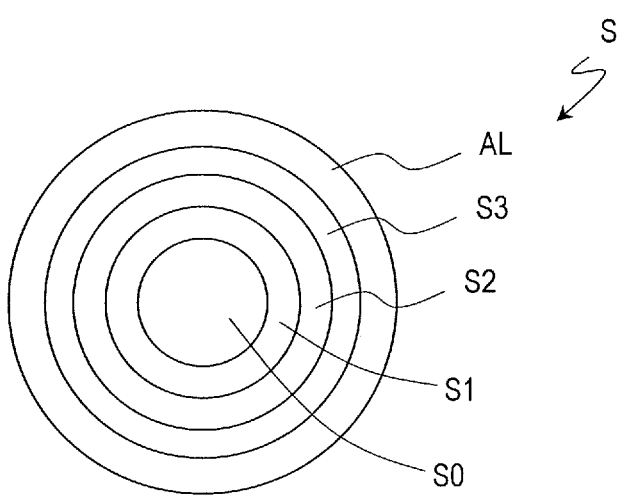
FIG. 12 (a) is a schematic cross-sectional view of a mold base for use in manufacture of a moth-eye mold of Comparative Example 1. (b) is a schematic diagram of the mold base shown in (a).
Figure 12:
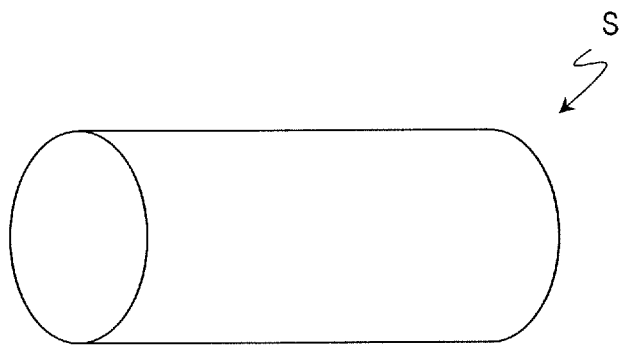

FIG. 12(a) is a schematic cross-sectional view of the mold base S for use in manufacture of a moth-eye mold 700 of Comparative Example 1. FIG. 12(b) is a schematic diagram of the mold base S. The mold base S has the shape of a generally circular pole. The diameter of the mold base S is 300 mm. The length of the mold base S is 500 mm. The surface of the mold base S is provided with an aluminum film. The mold base S includes a support S0, an insulating layer S1, an inorganic underlayer S2, a buffer layer S3, and an aluminum film AL.

Here, the support S0 is a nickel sleeve. The insulating layer S1 is formed of an acrylic paint by electrodeposition and painting. The thickness of the insulating layer S1 is not less than 5 μm and not more than 100 μm. The inorganic underlayer S2 is made of SiO$_2$. The thickness of the inorganic underlayer S2 is 100 nm. The buffer layer S3 is made of aluminum oxide. The thickness of the buffer layer S3 is not less than 30 nm and not more than 35 nm. The thickness of the aluminum film AL is 1 μm.

In manufacture of the moth-eye mold 700, anodization is first performed on the mold base S. The anodization of the mold base S is carried out in an anodization bath.

Figure 13:
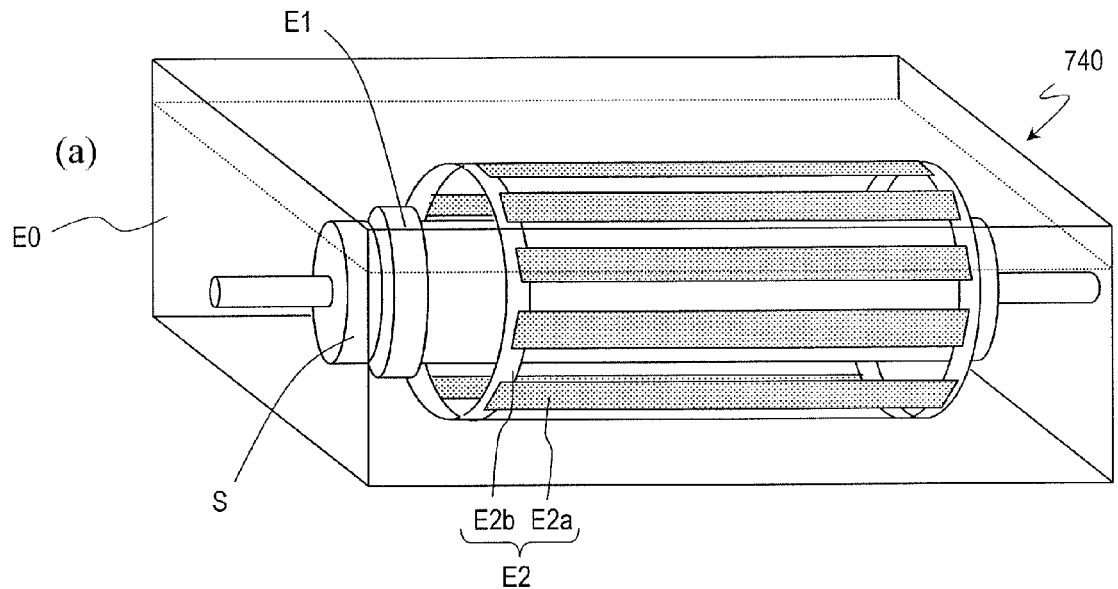
FIG. 13 (a) is a schematic diagram of an anodization bath in which anodization is performed for manufacture of the moth-eye mold of Comparative Example 1. (b) is a schematic cross-sectional view of a mold base immersed in an electrolytic solution of the anodization bath shown in (a).
Figure 13:
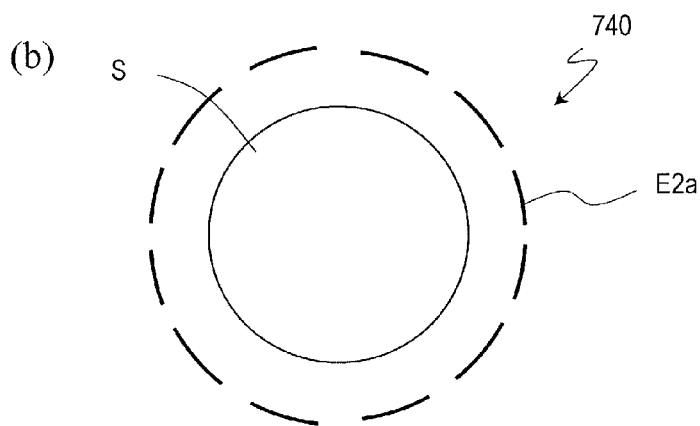

FIG. 13(a) is a schematic diagram of an anodization bath 740. FIG. 13(b) is a schematic cross-sectional view of the mold base S immersed in the electrolytic solution E0 of the anodization bath 740. In the anodization bath 740, oxalic acid at the concentration of 0.3 mass % is contained. The anode E1 is electrically coupled with the aluminum film AL. The cathode E2 is concentrically arranged around the mold base S.

The cathode E2 includes a plurality of linear portions E2a and connecting portions E2b which are in contact with opposite ends of the plurality of linear portions E2a. Each of the linear portions E2a is arranged parallel to the generating line of the mold base S. In the anodization bath 740, the shortest distance between the mold base S and the connecting portions E2b is smaller than the shortest distance between the mold base S and the linear portions E2a. In the anodization step, the mold base S is immersed in the oxalic acid contained in the anodization bath 740, and a voltage is applied for 39 seconds. Note that, in the anodization bath 740, the cathode E2 is not provided with a masking treatment.

Figure 14:
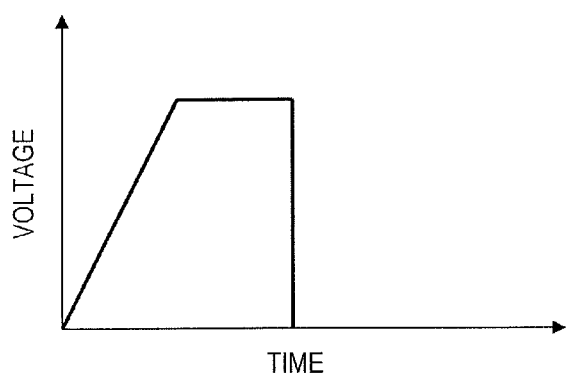
FIG. 14 A graph showing the transition of the voltage in the anodization bath shown in FIG. 13.

FIG. 14 shows the transition of the voltage in the anodization bath 740. In the anodization step, the voltage between the anode E1 and the cathode E2 is increased to the target value. The target value (finally-reached voltage) is set according to the pitch or average adjoining distance of the recessed portions. Here, the target value is 80 V. The voltage is increased to the target value in 25 seconds. Thereafter, the voltage is maintained at the target value for 14 seconds. By applying the voltage in this way, a porous alumina layer is formed over the surface of the aluminum film. When the target value is 80 V, the pitch or average adjoining distance of the recessed portions is 200 nm. Note that FIG. 14 shows the transition of the voltage in the anodized layer formation method of Comparative Example 1.

Thereafter, the etching step is performed. In the etching step, the mold base S is immersed in a 1 M phosphoric acid aqueous solution at 30° C. for 29 minutes.

The anodization step and the etching step which are performed on the mold base S are alternately performed such that each step is performed through a plurality of cycles. Specifically, the anodization step is performed through three cycles in total, and the etching step is performed through two cycles in total. By performing the anodization step and the etching step on the mold base S as described above, the moth-eye mold 700 of Comparative Example 1 is manufactured. The moth-eye mold 700 is used for production of an antireflection element 700R.

Figure 15:
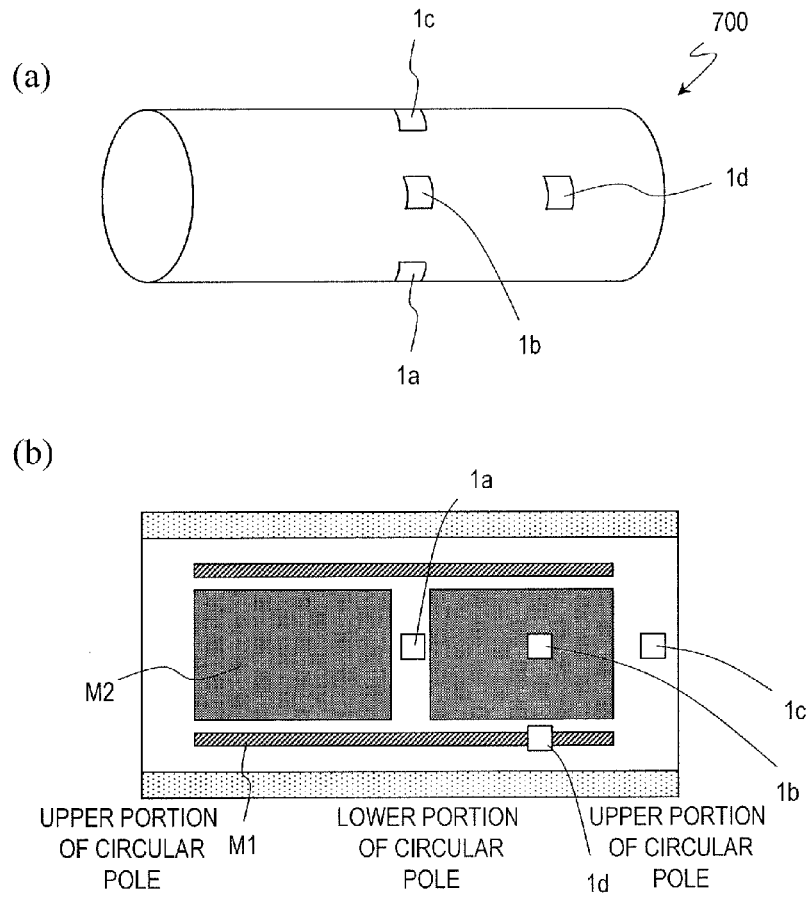
FIG. 15 (a) is a schematic diagram of the moth-eye mold of Comparative Example 1. (b) is a schematic unfolded view of the moth-eye mold shown in (a).
Figure 16:
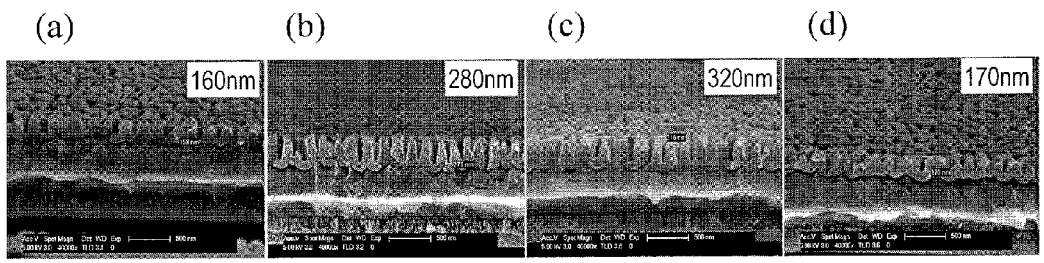
FIG. 16 (a) to (d) are schematic diagrams of cross-sectional SEM images of the moth-eye mold of Comparative Example 1.

FIG. 15(a) is a schematic diagram of the moth-eye mold 700 of Comparative Example 1. The moth-eye mold 700 has the shape of a generally circular pole. The diameter of the moth-eye mold 700 is 300 mm. The length of the moth-eye mold 700 is 500 mm. FIG. 15(b) is a schematic unfolded view of the moth-eye mold 700. The diagram of FIG. 15(b) is obtained by unfolding the lower part of the moth-eye mold 700 placed in the anodization bath 740 along the generating line.

In FIG. 15(b), a region of the moth-eye mold 700 in which linear roughness was visually perceived is shown as "region M1". A region of the moth-eye mold 700 in which roughness which looked like liquid trickles was visually perceived is shown as "region M2".

In FIG. 15(a) and FIG. 15(b), four regions of the mold 700 are referred to as "regions 1a to 1d". The region 1a is at the center of a lower portion of the circular pole. The region 1b is at the center of a lateral portion of the circular pole. The region 1c is at the center of an upper portion of the circular pole. The region 1d is at the right side of the lateral portion of the circular pole.

FIG. 16(a) to FIG. 16(d) show schematic diagrams of cross-sectional SEM images of the regions 1a to 1d, respectively, of the mold 700. In the cross-sectional SEM images, the depth of the recessed portions was measured. In the regions 1a to 1d of the mold 700, the average depths of the recessed portions were 160 nm, 280 nm, 320 nm, and 170 nm, respectively.

It is inferred that, in the moth-eye mold 700 having the above-described configuration, the roughness of the region M2 and the variation of the average depth of the recessed portions among the regions 1a to 1d are attributed to hydrogen bubbles generated at the cathode E2 during the anodization.

Figure 17:
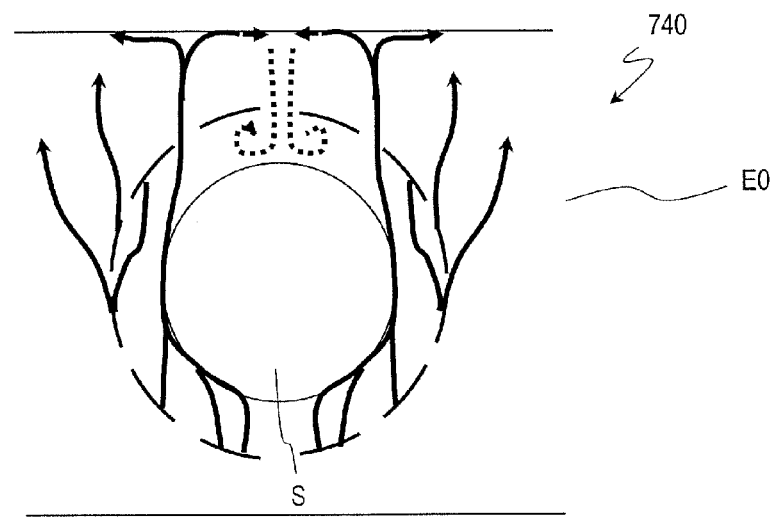
FIG. 17 A schematic cross-sectional view of the anodization bath shown in FIG. 13.

FIG. 17 is a schematic cross-sectional view of the anodization bath 740. In the anodization bath 740, hydrogen is generated at the cathode E2. Hydrogen generated at the cathode E2 forms bubbles. The bubbles ascend upward along the perimeter surfaces of the mold base S. In FIG. 17, streams of bubbles during the anodization are represented by bold arrowed lines, and liquid flows are represented by dotted arrowed lines.

The linear portions E2a of the cathode E2 are not provided at a position corresponding to the lowest part of the mold base S, and therefore, it is considered that the region M2 is separate in FIG. 15(b). Further, as described above, the shortest distance between the mold base S and the connecting portions E2b is smaller than the shortest distance between the mold base S and the linear portions E2a. The bubbles generated at the cathode during the anodization move upward in the electrolytic solution. These bubbles reach the lower part and the lateral part of the mold base S but would not reach the surface of the upper part. It is inferred that the region M1 is formed in a portion of the mold base S that the bubbles reach.

Now, the regions 1a, 1b, and 1d of the moth-eye mold 700 are compared. In the moth-eye mold 700, the regions 1a, 1b, and 1d are at different positions in the vicinity of the lengthwise center of the mold base S which has the shape of a generally circular pole. The average depths of the recessed portions of the regions 1a, 1b, and 1d of the moth-eye mold 700 are 160 nm, 280 nm, and 170 nm, respectively. It is inferred that, at a place where the flow of the electrolytic solution E0 which is incurred by hydrogen bubble streams is faster, the electrolytic solution E0 is more likely to be refreshed so that the anodization advances, and accordingly, the recessed portions of the mold 700 become deeper.

Next, the regions 1b and 1c of the moth-eye mold 700 are compared. In the moth-eye mold 700, the regions 1b and 1c are at different positions on the generating line in the vicinity of the center of a generally circular pole. The average depths of the recessed portions of the regions 1b and 1c of the moth-eye mold 700 are 280 nm and 320 nm, respectively. It is inferred that, hydrogen bubbles move as if they diffuse, and at a place where the flow of the electrolytic solution E0 which is incurred by bubble streams is faster, the electrolytic solution E0 is more likely to be refreshed so that the anodization advances, and accordingly, the recessed portions of the mold 700 become deeper.

The present inventors agitated the electrolytic solution in the anodization for the purpose of reducing the roughness which is attributed to bubbles generated at the cathode E2, but the roughness was confirmed even though the electrolytic solution was agitated. It is inferred that this roughness was generated by the flow of the electrolytic solution which was caused by agitation. Thus, the roughness cannot be reduced by simply agitating the electrolytic solution.

Next, a moth-eye mold manufacturing method of Comparative Example 2 is described.

Figure 18:
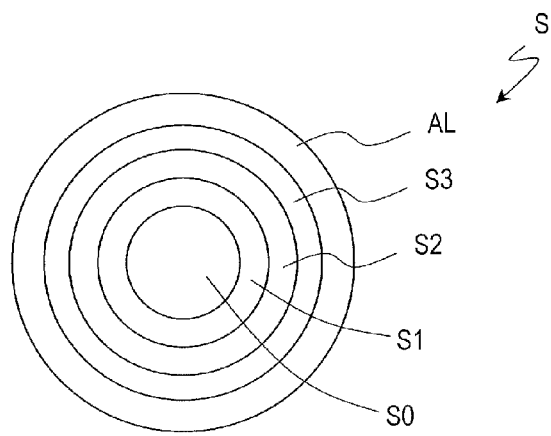
FIG. 18 (a) is a schematic cross-sectional view of a mold base for use in manufacture of a moth-eye mold of Comparative Example 2. (b) is a schematic diagram of the mold base shown in (a).
Figure 18:
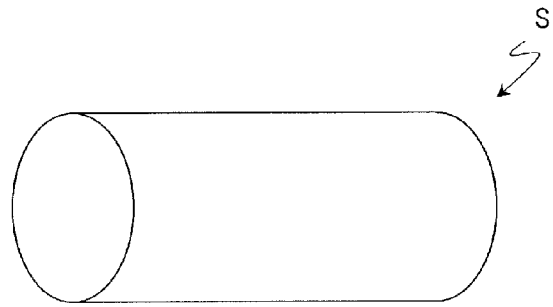

FIG. 18(a) is a schematic cross-sectional view of the mold base S for use in manufacture of a moth-eye mold 800 of Comparative Example 2. FIG. 18(b) is a schematic diagram of the mold base S. The mold base S has the shape of a generally circular pole. The diameter of the mold base S is 300 mm. The length of the mold base S is 1200 mm. The surface of the mold base S is provided with an aluminum film. The mold base S includes a support S0, an insulating layer S1, an inorganic underlayer S2, a buffer layer S3, and an aluminum film AL. Here, the support S0 is a nickel sleeve. The insulating layer S1 is formed of an acrylic paint by electrodeposition and painting. The thickness of the insulating layer S1 is not less than 5 µm and not more than 100 µm. The inorganic underlayer S2 is made of $SiO_2$. The thickness of the inorganic underlayer S2 is 100 nm. The buffer layer S3 is made of aluminum oxide. The thickness of the buffer layer S3 is not less than 30 nm and not more than 35 nm. The thickness of the aluminum film AL is 1 µm.

In manufacture of the moth-eye mold 800, anodization is first performed on the mold base S. The anodization of the mold base S is carried out in an anodization bath.

Figure 19:
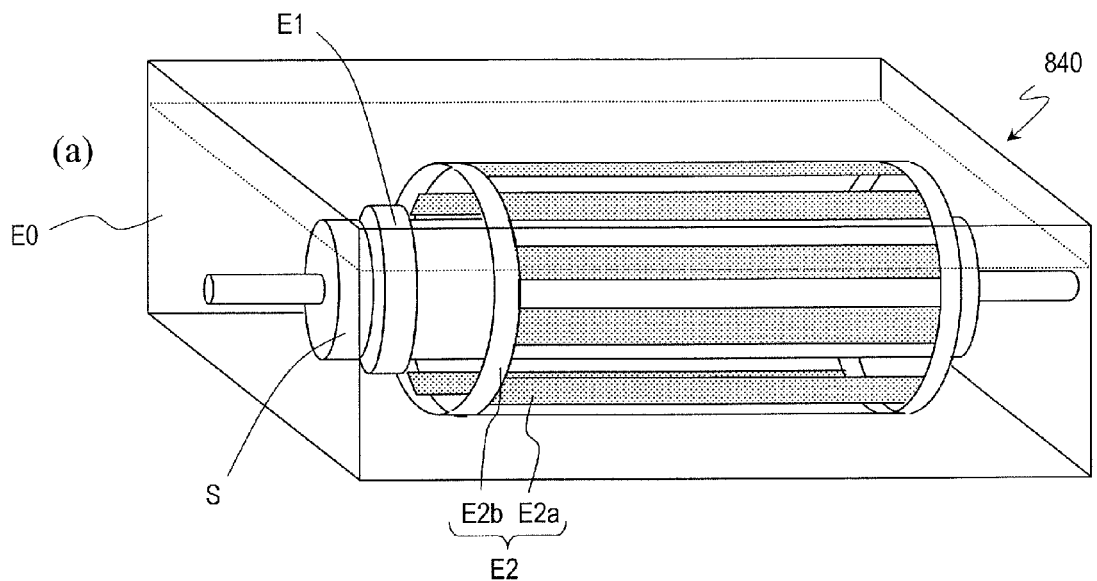
FIG. 19 (a) is a schematic diagram of an anodization bath in which anodization is performed for manufacture of the moth-eye mold of Comparative Example 2. (b) is a schematic cross-sectional view of a mold base immersed in an electrolytic solution of the anodization bath shown in (a).
Figure 19:
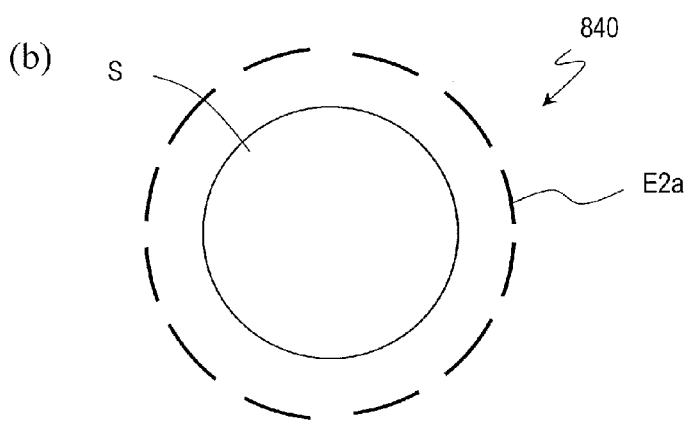

FIG. 19(a) is a schematic diagram of an anodization bath 840. FIG. 19(b) is a schematic cross-sectional view of the mold base S immersed in the electrolytic solution E0 of the anodization bath 840. In the anodization bath 840, oxalic acid at the solution temperature of 15° C. is contained. In the anodization bath 840, the cathode E2 is provided with a masking treatment. The cathode E2 is covered with a cloth. This arrangement reduces the roughness which is attributed to hydrogen bubbles generated at the cathode E2. In the anodization bath 840, the shortest distance between the mold base S and the connecting portions E2b is greater than the shortest distance between the mold base S and the linear portions E2a.

Figure 20:
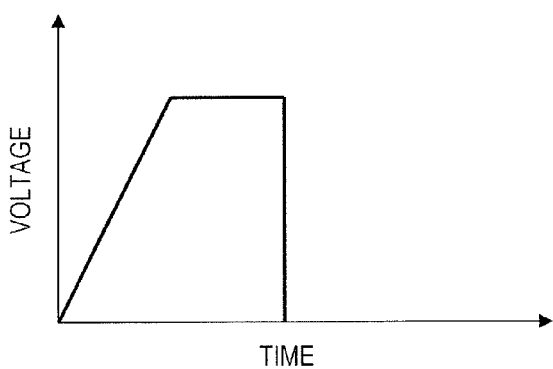
FIG. 20 A graph showing the transition of the voltage in the anodization bath shown in FIG. 19.

FIG. 20 shows the transition of the voltage in the anodization bath 840. In the anodization step, the voltage between the anode E1 and the cathode E2 is increased to the target value. Here, the target value is 80 V. The voltage is increased to the target value in 25 seconds. Thereafter, the voltage is maintained at the target value for 10 seconds. Note that the target value (finally-reached voltage) is set according to the pitch or average adjoining distance of the recessed portions. By applying the voltage in this way, a porous alumina layer is formed over the surface of the aluminum film. When the target value is 80 V, the pitch or average adjoining distance of the recessed portions is 200 nm. Note that FIG. 20 shows the transition of the voltage in the anodized layer formation method of Comparative Example 2.

Thereafter, the etching step is performed. In the etching step, the mold base S is immersed in a 1 M phosphoric acid aqueous solution at 30° C. for 19 minutes.

The anodization step and the etching step which are performed on the mold base S are alternately performed such that each step is performed through a plurality of cycles. Specifically, the anodization step is performed through seven cycles in total, and the etching step is performed through six cycles in total. By performing the anodization step and the etching step on the mold base S as described above, the moth-eye mold 800 is manufactured.

Figure 21:
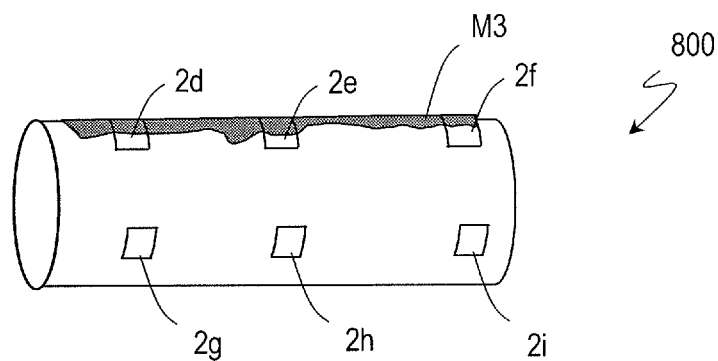
FIG. 21 (a) is a schematic diagram of the moth-eye mold of Comparative Example 2. (b) is a schematic unfolded view of the moth-eye mold shown in (a).
Figure 21:
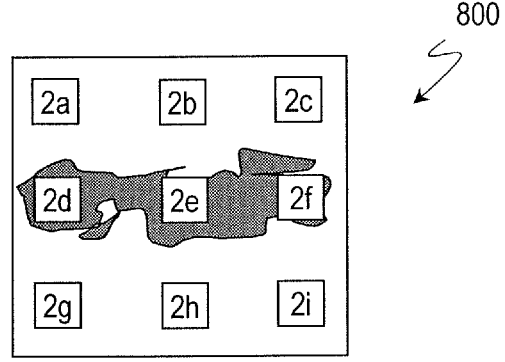
Figure 22:
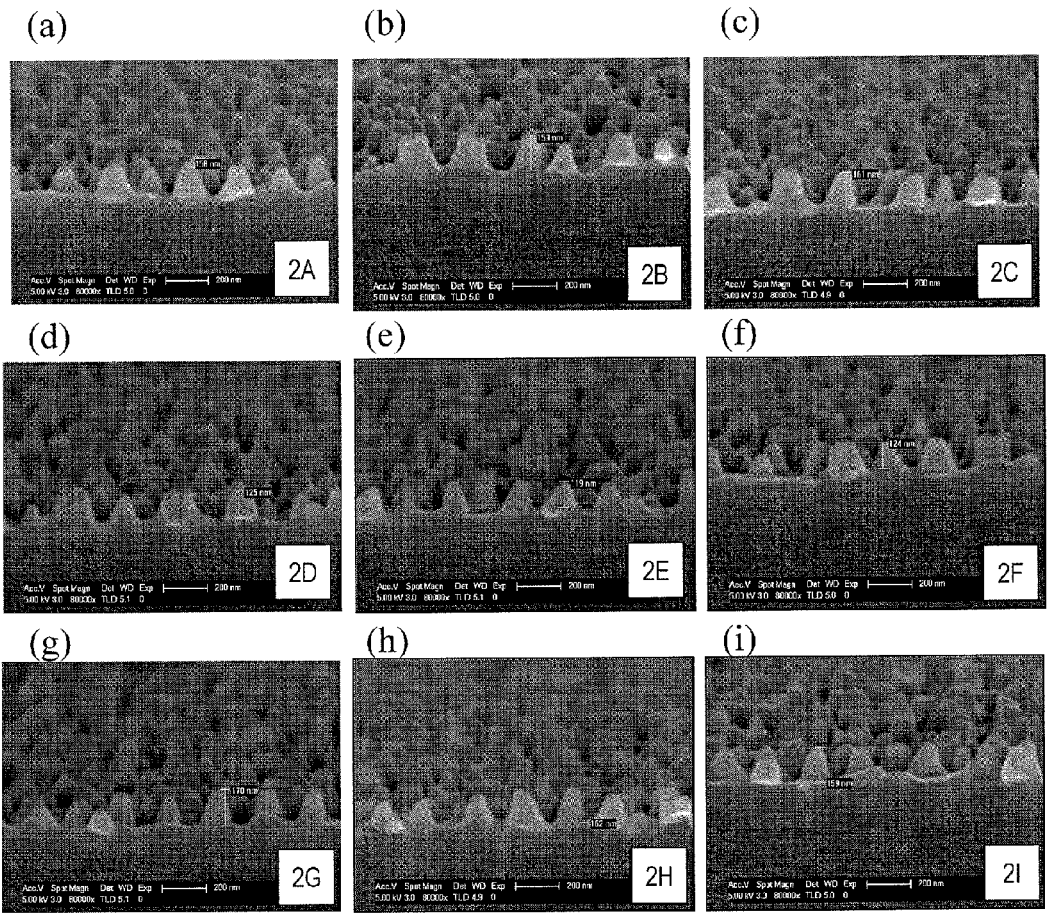
FIG. 22 (a) to (i) are schematic diagrams of cross-sectional SEM images of the antireflection element of Comparative Example 2.

FIG. 21(a) is a schematic diagram of the mold 800 of Comparative Example 2. The mold 800 has the shape of a generally circular pole. The diameter of the mold 800 is 300 mm. The length of the mold 800 is 1200 mm. FIG. 21(b) is a schematic unfolded view of the moth-eye mold 800. The diagram of FIG. 21(b) is obtained by unfolding the lower part of the moth-eye mold 800 placed in the anodization bath 840 along the generating line.

In the anodization bath 840, the cathode E2 is masked during the anodization, while it is not masked in the anodization bath 740. The masking reduces the roughness which is attributed to hydrogen bubbles generated at the cathode E2. Therefore, in the moth-eye mold 800, roughness which looks like liquid trickles would not be formed.

However, in the moth-eye mold 800, roughness is also visually perceived in the upper part. In FIG. 21(a), a region of the mold 800 in which such roughness was visually perceived is shown as "region M3".

In FIG. 21(b), nine regions of the mold 800 are shown as regions 2a to 2i. The region 2a is at the left side of the right lateral portion of the circular pole. The region 2b is at the center of the right lateral portion of the circular pole. The region 2c is at the right side of the right lateral portion of the circular pole. The region 2d is at the left side of the upper portion of the circular pole. The region 2e is at the center of the upper portion of the circular pole. The region 2f is at the right side of the upper portion of the circular pole. The region 2g is at the left side of the left lateral portion of the circular pole. The region 2h is at the center of the left lateral portion of the circular pole. The region 2i is at the right side of the left lateral portion of the circular pole. In the moth-eye mold 800, no roughness was visually perceived in the regions 2a to 2c and 2g to 2i while roughness was visually perceived in the regions 2d to 2f.

The moth-eye mold 800 is used for production of an antireflection element 800R. In the description below, regions of the antireflection element 800R respectively corresponding to the regions 2a to 2i of the moth-eye mold 800 are referred to as "regions 2A to 2I". No roughness was formed in the regions 2A to 2C and 2G to 2I of the antireflection element 800R, while roughness was visually perceived in the regions 2D to 2F.

FIG. 22(a) to FIG. 22(i) show schematic diagrams of cross-sectional SEM images of the regions 2A to 2I of the antireflection element 800R. In the cross-sectional SEM images, the height of the raised portions in the regions 2A to 2C and 2G to 2I of the antireflection element 800R is about 160 nm, while the height of the raised portions in the regions 2D to 2F about 125 nm. Thus, the height of the raised portions in the regions 2D to 2F is lower than the height of the raised portions in the other regions by 20% or more.

Figure 23:
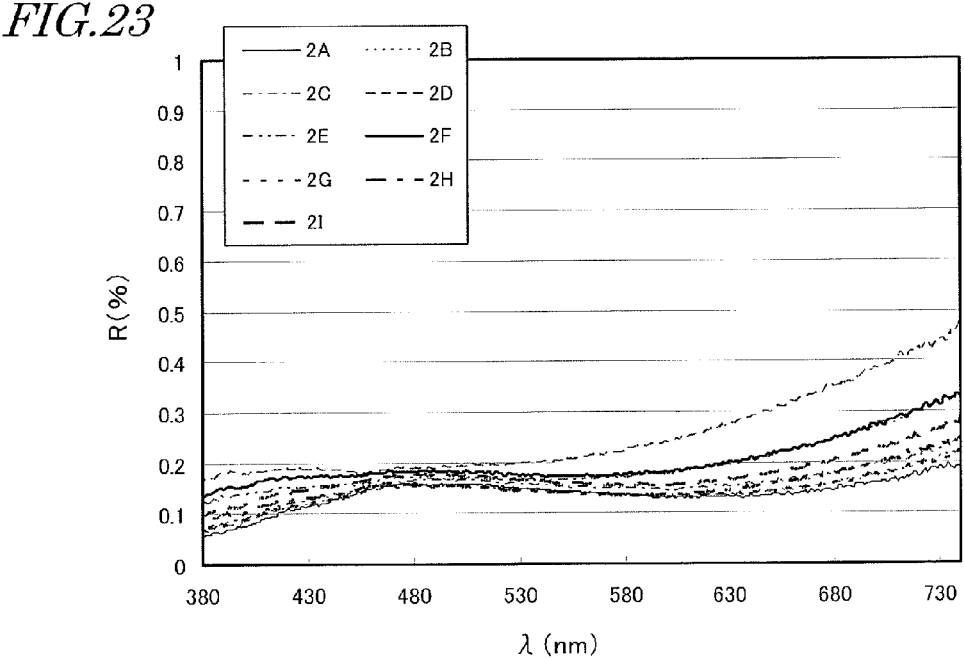
FIG. 23 A graph showing measurement results of a five-degree regular reflection measurement of the antireflection element shown in FIG. 22.

FIG. 23 shows measurement results of a five-degree regular reflection measurement of the regions 2A to 2I of the antireflection element 800R. As seen from FIG. 23, the reflectances of the regions 2A to 2C and 2G to 2I of the antireflection element 800R are relatively low, while the reflectances of the regions 2D to 2F of the antireflection element 800R are relatively high particularly in a high wavelength range.

The present inventors considered the temperature of the mold base S in the anodization step and measured the temperatures of the upper part and the lower part of the mold base S in the anodization bath 840. Meanwhile, the peak current during the anodization was measured concurrently.

Figure 24:
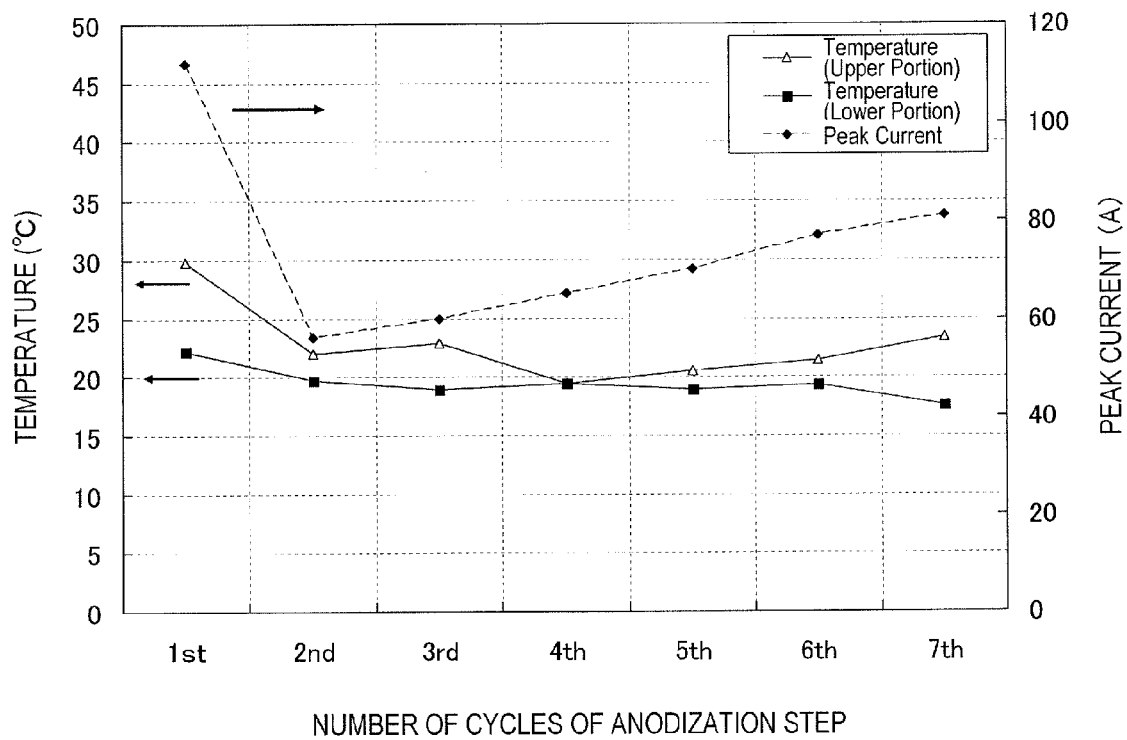
FIG. 24 A graph showing the temperature of the base and the peak current in respective cycles of the anodization step in manufacture of the moth-eye mold of Comparative Example 2.

FIG. 24 shows the temperature of the mold base S and the peak current in respective cycles of the anodization step in manufacture of the mold 800 of Comparative Example 2. As described above, in manufacture of the mold 800, the anodization step is performed through seven cycles.

In either of the cycles of the anodization step, the temperature of the upper part is equal to or higher than the temperature of the lower part. Particularly in the first cycle of the anodization step, the temperature of the upper part is higher than the temperature of the lower part by 8° C. This is probably due to convection of the electrolytic solution.

Considering the temperature of the lower part, the temperature in the first anodization cycle is higher than the temperature in the second and subsequent anodization cycles. This is probably because a large electric current flows when a barrier layer is first formed. Considering the temperature of the upper part, the temperature in the first anodization cycle is higher than the temperature in the second and subsequent anodization cycles. This is also probably because a large electric current flows when a barrier layer is first formed.

Considering the peak current, the peak current in the first anodization cycle is relatively large, and the peak current in the second anodization cycle greatly decreases as compared with the first anodization cycle. Note that, in the anodization cycles subsequent to the second cycle, the peak current slowly increases. This is probably because the resistance increased due to the decrease of the thickness of the aluminum film which was caused by repetition of electrolysis, and accordingly, the quantity of generated heat and the reaction speed increased, and as a result, the peak current increased.

As described above, the anodization bath 840 is different from the anodization bath 740 in that the cathode E2 is masked so that the roughness which is attributed to hydrogen bubbles generated at the cathode E2 is reduced. It is inferred from this that the roughness in the moth-eye mold 800 is attributed to the difference in temperature in the anodization.

It is commonly known that when the temperature in the anodization increases, the anodization advances, and the advancing speed of the depth of the recessed portions increases. However, as described above, the average height of the regions 2D to 2F of the antireflection element 800R corresponding to the regions 2d to 2f of the mold 800 in which the temperature is high is lower than the average height of the regions 2A to 2C and 2G to 2I of the antireflection element 800R corresponding to the regions 2a to 2c and 2g to 2i of the mold 800 in which the temperature is low.

Here, the temperature of oxalic acid is relatively low at the start of the anodization. During the anodization, when the temperature of oxalic acid is relatively low, only the anodization occurs while the etching rarely occurs. When the temperature of oxalic acid is relatively high, the etching advances to some extent along with the anodization. For this reason, it is inferred that the recessed portions formed in the regions 2d to 2f of the mold 800 had a moderate slope as compared with those formed in the regions 2a to 2c and 2g to 2i, and as a result, in the antireflection element 800R, the average height of the raised portions of the regions 2D to 2F was lower than that of the regions 2A to 2C and 2G to 2I.

As described above, in the anodized layer formation method of Comparative Example 2, the voltage is continuously increased, and heat is continuously generated, so that the anodization is carried out at a relatively high temperature. As such, the reaction speed and the electric current increase, and the quantity of heat generated transiently (within a short period) increases. Further, due to convection of heat, the temperature of the upper part of the mold base S is particularly high, so that the etching advances along with the anodization.

Next, a method for manufacturing the moth-eye mold 100 of the present embodiment is described. First, the mold base S is provided. The mold base S is the same as that previously described with reference to FIG. 8. Here, the support S0 is a nickel sleeve. The insulating layer S1 is formed of an acrylic paint by electrodeposition and painting. The thickness of the insulating layer S1 is not less than 5 μm and not more than 100 μm. The inorganic underlayer S2 is made of $SiO_2$. The thickness of the inorganic underlayer S2 is 100 nm. The buffer layer S3 is made of aluminum oxide. The thickness of the buffer layer S3 is not less than 30 nm and not more than 35 nm. The thickness of the aluminum film AL is 1 μm.

When the moth-eye mold 100 is manufactured, the anodization step is performed on the mold base S. The anodization of the mold base S is carried out in the anodization bath 40 which has previously been described with reference to FIG. 9. In the anodization bath 40, oxalic acid at the solution temperature of 15° C. is contained. In the anodization bath 40, the cathode E2 is provided with a masking treatment. The cathode E2 is covered with a cloth. This arrangement reduces the roughness which is attributed to hydrogen bubbles generated at the cathode E2.

The transition of the voltage in the anodization bath 40 is described with again reference to FIG. 4. First, the voltage is increased to the first peak value. Here, the voltage is increased such that the first peak value reaches 35 V in 10 seconds. Thereafter, the voltage is decreased. Here, the voltage is maintained at zero for 3 minutes. In this period, the anodization bath 40 is shaken. Although the temperature of the mold base S increases due to the previous voltage increase, heat diffusion efficiently occurs as the voltage decreases due to the shaking of the anodization bath 40. Note that, when the period during which the voltage is decreased from the peak value to a value other than zero is relatively long, the electric current may start to flow again in some cases. When the period during which the voltage is low is relatively short (e.g., for several minutes), the electric current scarcely flows.

Then, the voltage is increased to the second peak value. The second peak value is higher than the previously-reached first peak value. The second peak value is 80 V. Here, the voltage is increased to the second peak value, 80 V, in 25 seconds. Thereafter, the voltage is decreased. Here, the voltage is maintained at zero for 3 minutes. Note that, in this period, the anodization bath 40 is shaken.

Thereafter, the voltage is increased to the target value. The target value is equal to or higher than the second peak value. The target value is 80 V. Here, the voltage is increased to the target value, 80 V, in 25 seconds, and thereafter, the target value is maintained for 13 seconds. Thereafter, the voltage is decreased. In this way, the first anodization cycle is carried out.

Then, the first cycle of the etching step is carried out. In the etching step, the mold base S is immersed in a 1 M phosphoric acid aqueous solution at 30° C. for 19 minutes.

Thereafter, the anodization step and the etching step are alternately repeated. Specifically, the anodization step is performed through seven cycles in total, and the etching step is performed through six cycles in total. The duration of each of the second to seventh cycles of the anodization is 38 seconds. In each of the second to seventh cycles of the anodization, the voltage is increased to the target value, 80 V, in 25 seconds, and thereafter, the target value is maintained for 13 seconds. The duration of the second to sixth cycles of the etching is 19 minutes. In this way, according to the present embodiment, the anodization step and the etching step are performed on the mold base S, whereby the mold 100 is manufactured.

Figure 25:
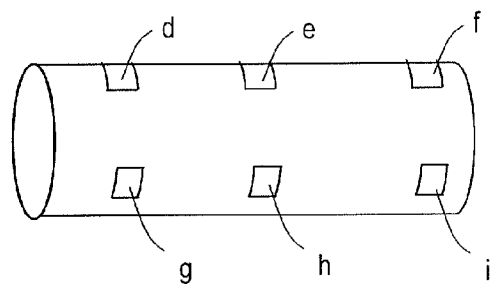
FIG. 25 (a) is a schematic diagram of the moth-eye mold of the present embodiment. (b) is a schematic unfolded view of the moth-eye mold shown in (a).
Figure 25:
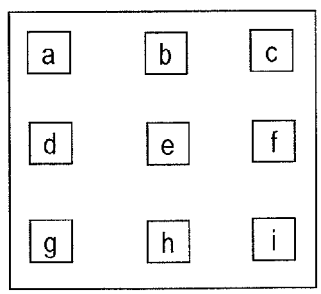

FIG. 25(a) is a schematic diagram of the moth-eye mold 100 of the present embodiment. FIG. 25(b) is a schematic unfolded view of the moth-eye mold 100. The mold 100 has the shape of a generally circular pole. The diameter of the mold 100 is 300 mm. The length of the mold 100 is 1200 mm.

In FIG. 25(b), nine regions of the mold 100 are shown as regions a to i. The region a is at the left side of the right lateral portion of the circular pole. The region b is at the center of the right lateral portion of the circular pole. The region c is at the right side of the right lateral portion of the circular pole. The region d is at the left side of the upper portion of the circular pole. The region e is at the center of the upper portion of the circular pole. The region f is at the right side of the upper portion of the circular pole. The region g is at the left side of the left lateral portion of the circular pole. The region h is at the center of the left lateral portion of the circular pole. The region i is at the right side of the left lateral portion of the circular pole. In the mold 100, no roughness was visually perceived in the regions a to i.

The moth-eye mold 100 is used for production of an antireflection element 100R. In the description below, regions of the antireflection element 100R respectively corresponding to the regions a to i of the moth-eye mold 100 are referred to as "regions A to I". In the antireflection element 100R, no roughness was visually perceived in the regions A to I.

As described above, according to the anodized layer formation method of the present embodiment, the voltage is increased stepwise. When the voltage is lower than the previous peak value, heat which has been generated during the increase of the voltage to the previous peak value is diffused to the electrolytic solution. Therefore, the anodization is carried out at a relatively low temperature, and the increase of the reaction speed and the increase of the electric current are prevented, so that the quantity of heat generated transiently (within a short period) is reduced.

FIG. 26(a) to FIG. 26(i) are schematic diagrams of cross-sectional SEM images of the regions A to I of the antireflection element 100R. Among the regions A to I of the antireflection element 100R, the average height of the raised portions is generally equal, which is about 160 nm. The pitch or average adjoining distance of the raised portions is 200 nm.

Figure 26:
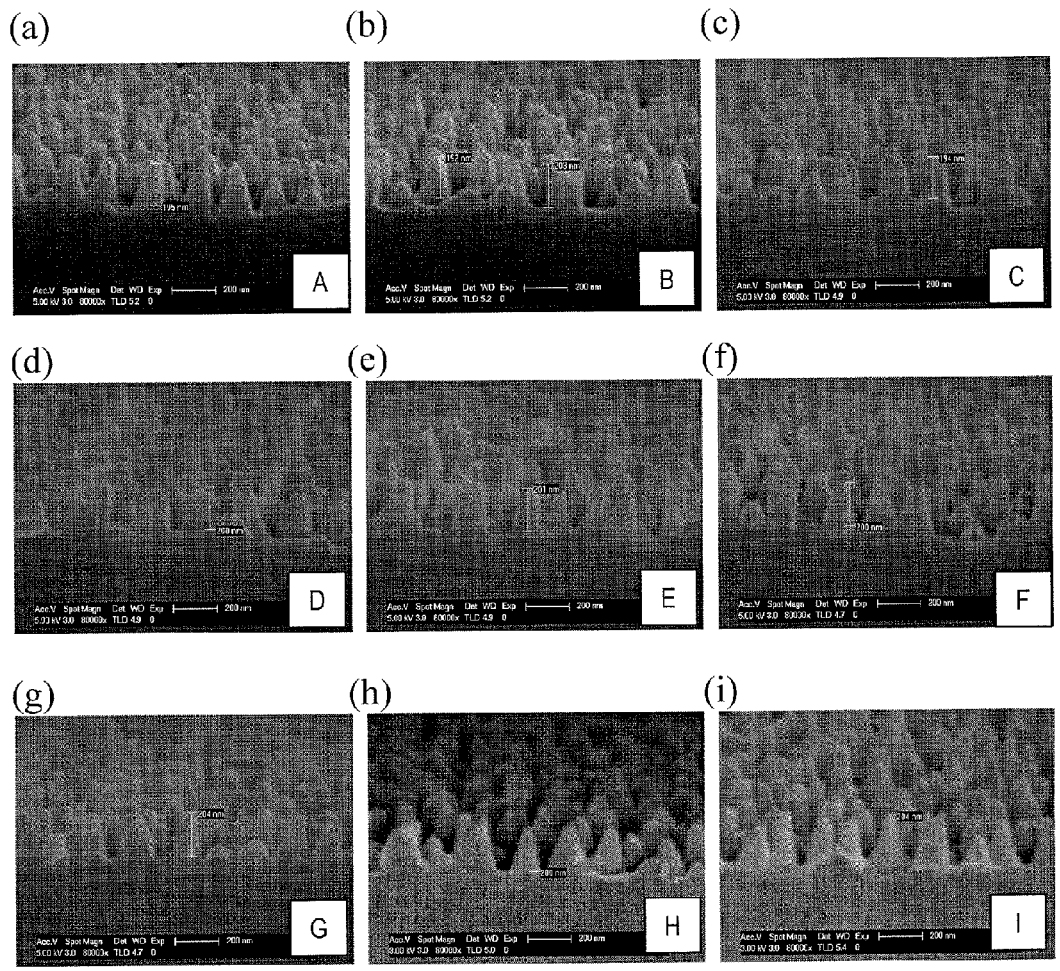
FIG. 26 (a) to (i) are schematic diagrams of cross-sectional SEM images of the antireflection element of the present embodiment.
Figure 27:
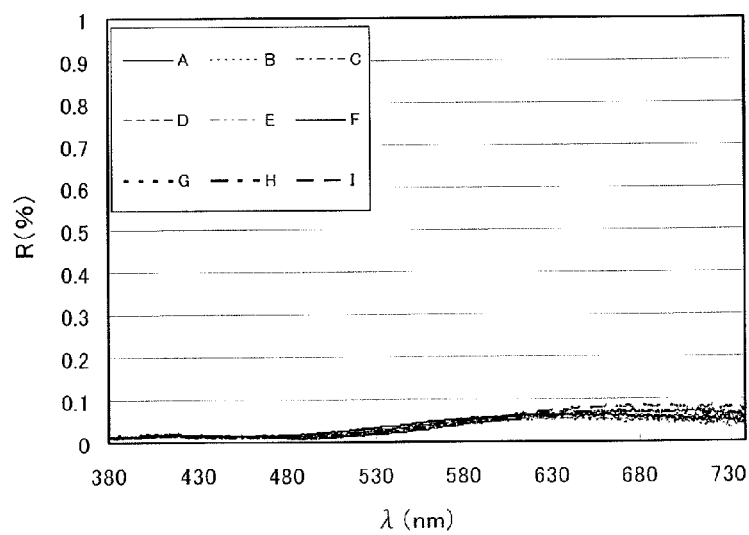
FIG. 27 A graph showing measurement results of a five-degree regular reflection measurement of the antireflection element shown in FIG. 26.

FIG. 27 is a graph showing measurement results of a five-degree regular reflection measurement of the regions A to I of the antireflection element 100R shown in FIG. 26. In each of the regions A to I, the reflectance over the visible light range is low, which is less than 0.1%. Also, the variation of the reflectance among the regions A to I is reduced. Thus, the antireflection element 100R with reduced reflection characteristics can be produced.

As described above, in the anodized layer formation method of Comparative Example 2, the difference in temperature between the upper part and the lower part of the mold base S is relatively large. It is inferred that such a difference in temperature increases as the quantity of heat generated per unit time increases. As described above, in the anodized layer formation method of Comparative Example 2, the anodization is carried out in such a manner that the voltage is increased once. The voltage is increased to the target value (80 V) in 25 seconds and then maintained for 10 seconds.

Figure 28:
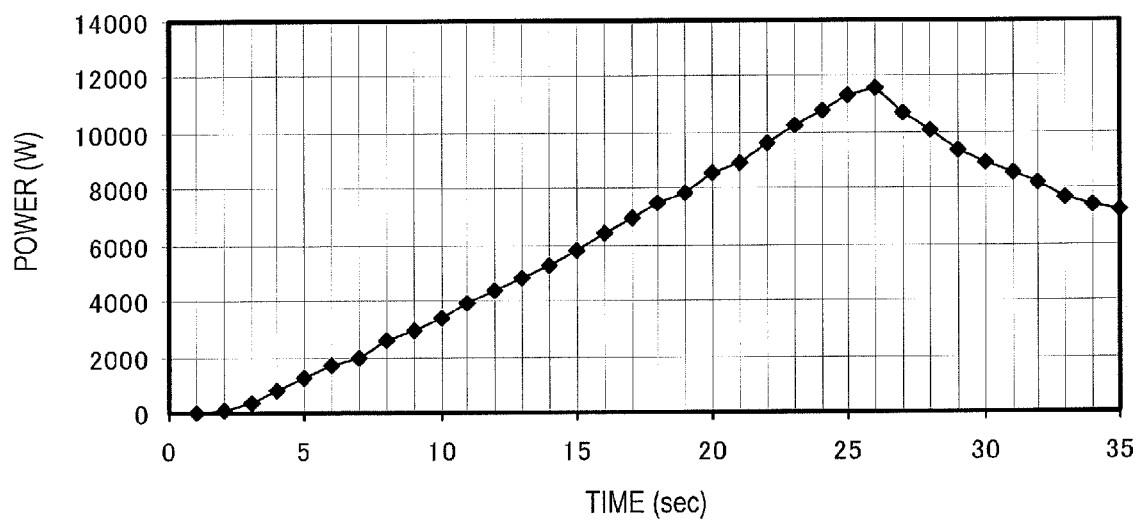
FIG. 28 A graph showing the transition of the power in an anodized layer formation method of Comparative Example 2.

FIG. 28 is a graph showing the time change of the power during the increase of the voltage to the target value. Here, the diameter of the mold base S is 300 mm, and the length of the mold base S is 1600 mm. The power increases as the voltage increases (with the passage of time) and reaches the local maximum around the 25th second. Thereafter, the electric current decreases with the passage of time while the voltage is maintained, and thus, the power decreases.

In this case, the quantity of generated heat is 217.1 kJ, and the maximum of the power per unit area is $w_{max}=8873$ (W/m$^2$) Thus, in the anodized layer formation method of Comparative Example 2, the maximum of the power per unit area is relatively large so that a difference in temperature occurs due to convection. As a result, it is inferred that the variation occurred in the recessed portions of the anodized layer.

On the other hand, in the present embodiment, the quantity of heat generated per unit time can be reduced. Therefore, the difference in temperature in the mold base S can be reduced.

Hereinafter, the variation of the quantity of heat per unit time in the anodized layer formation method of the present embodiment is described with reference to FIG. 29 and FIG. 30.

Figure 29:
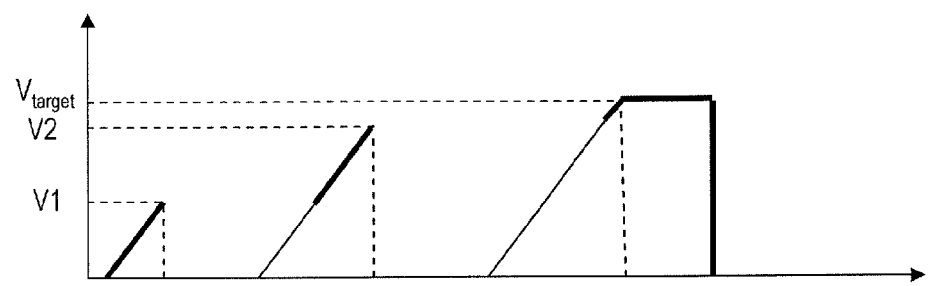
FIG. 29 A graph showing durations in which an electric current flows in the anodization step shown in FIG. 4.
Figure 30:
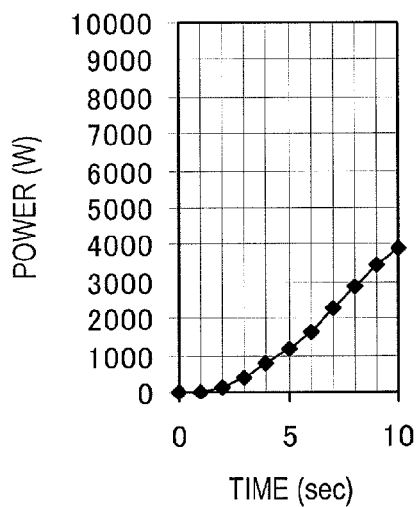
FIG. 30 (a) to (c) are graphs showing the transition of the power during the increase of the voltage to the first peak value, to the second peak value, and to the target value, respectively, in the anodized layer formation method shown in FIG. 29.
Figure 30:
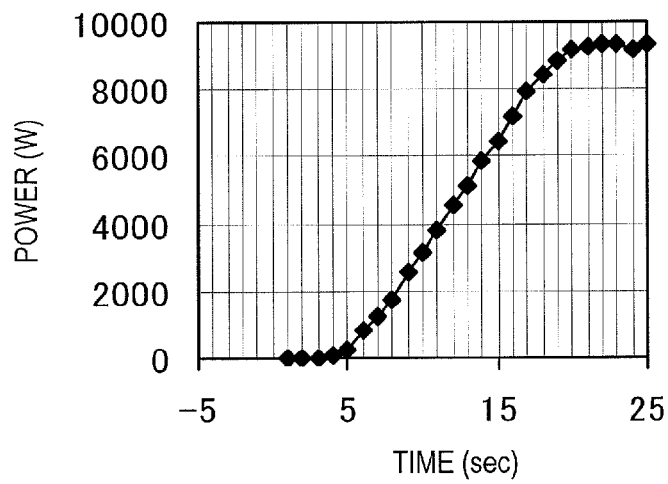
Figure 30:
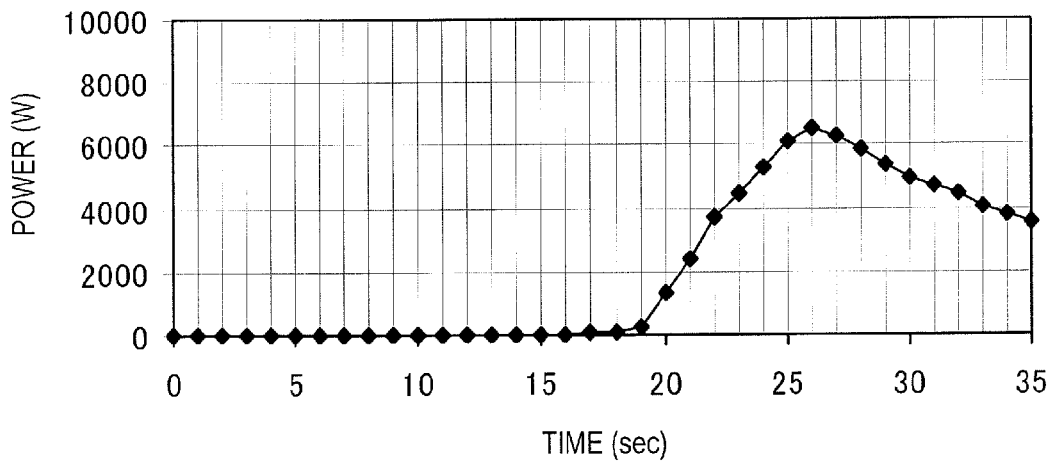
Figure 31:
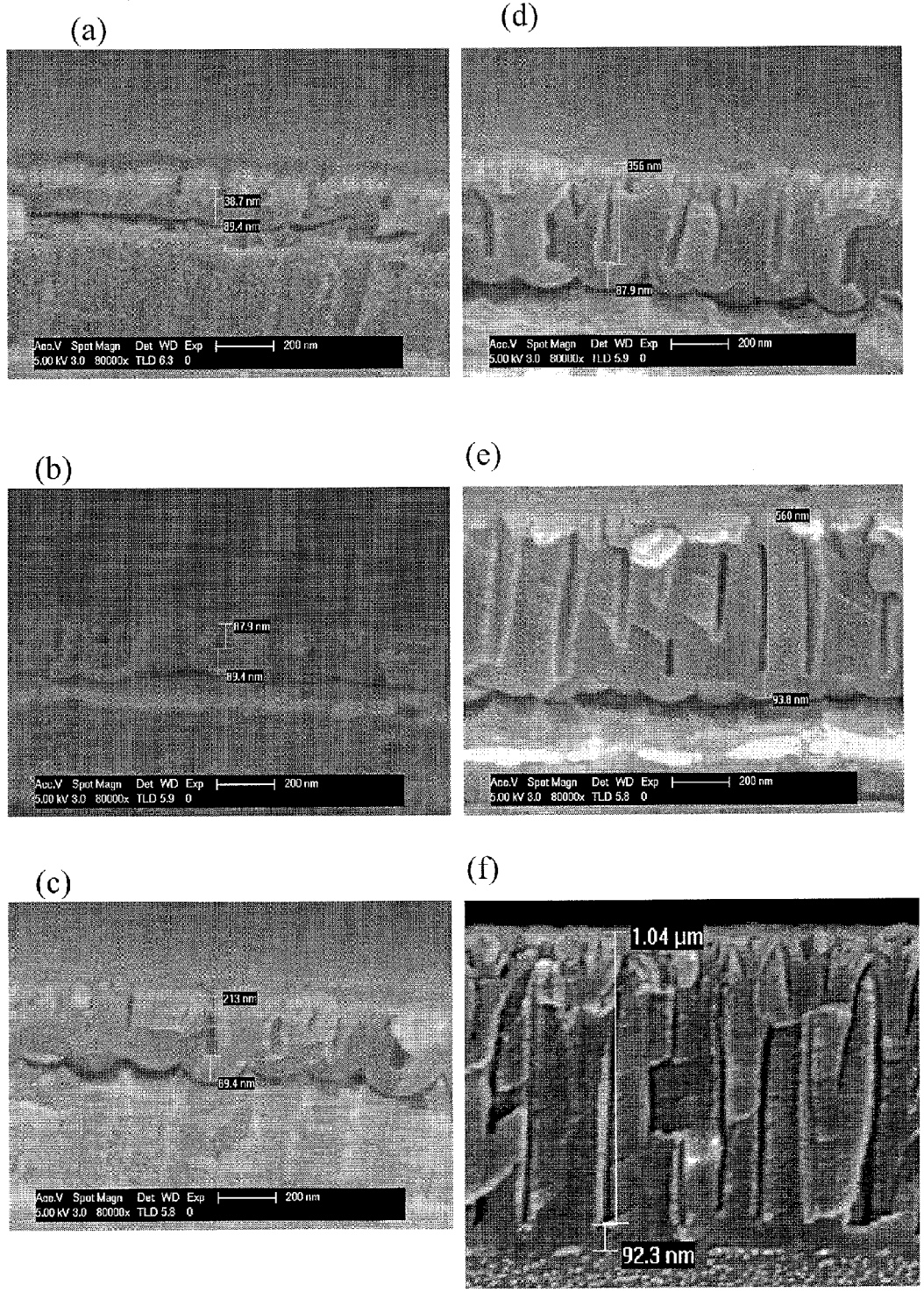
FIG. 31 (a) to (f) are schematic diagrams of cross-sectional SEM images of moth-eye molds for which the voltage was changed with different time change rates.

FIG. 29 shows the time change of the voltage in the formation method of the anodized layer 10 of the present embodiment. In FIG. 29, the durations in which an electric current theoretically flows are shown by bold lines.

As described above, a barrier layer which is formed at a certain voltage contains alumina which has a high insulating property. To further advance the anodization after that, it is necessary to apply a voltage which is equal to or higher than the previously-applied voltage.

In the case where the voltage of the first peak value is once applied to carry out the anodization and thereafter the voltage is increased to the second peak value, an electric current starts to flow again after the voltage has reached the first peak value. In the case where the voltage of the second peak value is applied to carry out the anodization and thereafter the voltage is increased to the target value, an electric current starts to flow again after the voltage has reached the second peak value. In this way, the voltage is increased stepwise to the target value, so that the thickness of the barrier layer also increases stepwise. Thus, the quantity of the electric current is reduced, so that the quantity of heat generated per unit time (i.e., power) can be reduced.

The power W is represented by the product of the voltage V and the current I (W=V×I). The total quantity of heat generated in that case, E, is obtained by integrating the power W over time.

Although in FIG. 29 the second peak value is shown lower than the target value, here, as described above, the first peak value, the second peak value, and the target value are 35 V, 80 V, and 80 V, respectively. The voltage increases to the first peak value in 10 seconds and to the second peak value in 25 seconds. The voltage increases to the target value in 25 seconds, and thereafter, it is maintained for 10 seconds.

Now, the time change of the power in the anodization step in formation of the anodized layer 10 of the present embodiment is described with reference to FIG. 30.

FIG. 30(a) is a graph showing the time change of the power during the increase of the voltage to the first peak value. FIG. 30(b) is a graph showing the time change of the power during the increase of the voltage to the second peak value. FIG. 30(c) is a graph showing the time change of the power during the increase of the voltage to the target value. Note that, in each of FIG. 30(a), FIG. 30(b), and FIG. 30(c), the horizontal axis represents the time (sec), and the vertical axis represents the power (W).

In FIG. 30(a), the power increases with the passage of time. This is because the applied voltage increases with the passage of time, and accordingly, the electric current increases.

In FIG. 30(b), after 5 seconds have passed, the power increases with the passage of time and becomes saturated around the 20th second. When the voltage is small at the start, no electric current flows, so that the power is zero. When the voltage increases to some extent, an electric current starts to flow.

In FIG. 30(c), after 18 seconds have passed, the power increases with the passage of time and reaches the local maximum around the 25th second. Thereafter, the voltage is maintained while, however, the electric current decreases with the passage of time, so that the power decreases.

The quantities of heat generated in increasing the voltage to the first peak value, to the second peak value, and to the target value are 16.5 kJ, 123.7 kJ, and 73.2 kJ, respectively. Note that the quantity of heat generated per unit time is represented as the power (W). In this case, the maximums of the power per unit area are $w1_{max}$=2787 W/m$^2$, $w2_{max}$=6935 W/m$^2$, and $w3_{max}$=4968 W/m$^2$.

As described above, in the anodized layer formation method of Comparative Example 2, the maximum per unit area was 8873 W/m$^2$. In the anodized layer formation method of the present embodiment, the maximum per unit area can be reduced, and accordingly, the variation of the recessed portions in the anodized layer can be reduced.

Particularly in the case where the mold base S includes the insulating layer S1 that has relatively low thermal conductivity, when the quantity of heat per unit time (i.e., power) is large, the difference in temperature of the mold base S is likely to be large, and accordingly, a variation of the recessed portions is likely to occur. However, according to the anodized layer formation method of the present embodiment, the variation of the recessed portions can be efficiently reduced. The present inventors conducted a plurality of experiments under different conditions from those described above. When the maximum of the power per unit area did not exceed 8500 W/m$^2$, the variation of the recessed portions in the anodized layer was reduced.

Note that, herein, the increase and decrease of the voltage is caused twice before the voltage is increased to the target value, although the present invention is not limited to this example. However, to avoid complicatedness, it is preferred that the increase and decrease of the voltage is caused less than ten times before the voltage is increased to the target value. Note that, when the time rate change in the voltage is not more than 0.57 V/s, even continuously increasing the voltage to the target value without decrease of the voltage enables reduction of the quantity of generated heat and accordingly reduction of the variation. However, as described above, pores in the shape of tree branches are disadvantageously formed. On the other hand, the time rate change in the voltage is more than 0.57 V/s and less than 20 V/s, continuously increasing the voltage to the target value without decrease of the voltage leads to generation of a large quantity of heat, so that a variation can occur in some cases.

Herein, the mold base S includes the support S0 and the aluminum film AL that is provided on the support S0, although the present invention is not limited to this example. The mold base S may be an aluminum base. However, when the aluminum film AL is provided on the support S0 with the insulating layer S1 being interposed therebetween, heat is more likely to reside in the aluminum film AL as the thickness of the aluminum film AL decreases. Therefore, the effect produced by application of the present embodiment is large.

The time rate change in the increasing voltage is preferably more than 0.57 V/s and less than 20 V/s. If the time change of the voltage is sharp, the voltage and the electric current sharply change and can exceed the electric capacity of the power supply in some cases. A power supply which has a large electric capacity is disadvantageous in cost and size.

Thus, it is preferred that the increase time rate change in the voltage is not equal to or more than 20 V/s.

The lower limit of the time rate change in the voltage is determined as described below. Hereinafter, the barrier layer and the porous layer of the anodized layer in samples with different time change rates of the voltage are described.

First, six mold bases are provided. Each of the six mold bases has the same configuration as that of the mold base which has previously been described with reference to FIG. 12. Anodization is performed on these six mold bases using oxalic acid at the concentration of 0.3 mass % at the solution temperature of 18° C. For each of the mold bases, the voltage is once increased to the target value, 80 V. Note that, however, the time rate change in the voltage is different among the mold bases. In this way, samples Sa to Sf are prepared from the six mold bases.

The time change rates of the voltage of the samples Sa to Sf are 1.6 V/s, 0.8 V/s, 0.32 V/s, 0.16 V/s, 0.08 V/s, and 0.032 V/s, respectively. The voltage application durations of the samples Sa to Sf are 50 seconds, 100 seconds, 250 seconds, 500 seconds, 1000 seconds, and 2500 seconds, respectively. There is no period in which the voltage is constant in the power supply.

For each of the samples Sa to Sf, the time rate change in the voltage, the voltage application duration (sec), the thickness of the barrier layer (nm), and the thickness of the porous layer (nm) are shown in Table 1.

TABLE 1

| Samples | Sa | Sb | Sc | Sd | Se | Sf |
| --- | --- | --- | --- | --- | --- | --- |
| Time rate change in voltage (V/s) | 1.6 | 0.8 | 0.32 | 0.16 | 0.08 | 0.032 |
| Voltage application duration (sec) | 50 | 100 | 250 | 500 | 1000 | 2500 |
| Barrier layer thickness (nm) | 89.4 | 89.4 | 89.4 | 87.9 | 93.8 | 92.3 |
| Porous layer thickness (nm) | 38.7 | 87.9 | 213 | 356 | 560 | 1040 |

FIG. 31(a) to FIG. 31(f) are schematic diagrams of cross-sectional SEM images of the anodized layers of the samples Sa to Sf. For each of the samples Sa to Sf, the target value of the voltage is 80 V, and the thickness of the barrier layer is generally constant irrespective of the time rate change in the voltage. On the other hand, as the time rate change in the voltage is smaller, i.e., as the voltage application duration is longer, the thickness of the porous layer increases.

In the cross-sectional SEM images of the samples Sc to Sf, micropores in the shape of tree branches are conspicuously seen. In the samples Sc to Sf, the pitch of the micropores is narrow at the start of the increase of the voltage, but the thickness of the barrier layer gradually increases according to the increase of voltage so that the pitch of the micropores increases. The pitch is approximately twice the thickness of the barrier layer. For this reason, it is inferred that, the micropores were formed so as to have a tree branch shape. When the micropores in the shape of tree branches are formed, the micropores are not vertically formed so that the inverted moth-eye structure cannot be appropriately formed. Thus, when the time rate change in the voltage is excessively small, the micropores that define the recessed portions are not vertically formed. On the other hand, in the samples Sa and Sb, micropores in the shape of tree branches were not seen. Thus, when the time rate change in the voltage is relatively large, the micropores that define the recessed portions are vertically formed.

As described above, when the inverted moth-eye structure is formed, it is preferred to carry out the etching step after the anodization step. Although micropores in the shape of tree branches were not seen in the samples Sa and Sb, even if small micropores in the shape of tree branches were formed in the samples Sa and Sb, the small micropores in the shape of tree branches would be dissolved in the etching step and therefore would not matter.

For example, in the case where the average adjoining distance of the recessed portions is 200 nm, when the total thickness of a portion of the barrier layer which is etched away in each of the recessed portions is from 60 nm to 96 nm, adjoining recessed portions communicate with each other. The etching rate in phosphoric acid at the concentration of 1 mol/l at 30° C. is 0.6 to 0.8 nm/min. In this case, the total etching duration is 100 to 120 minutes. When calculating the duration of the anodization which leads to that the depth of the porous layer is 96 nm with the use of an approximation curve, the calculated duration is about 140 seconds. In this case, the time rate change in the voltage is 0.57 V/s (=80/140). In the case where the time rate change in the voltage is greater than this value, even if micropores in the shape of tree branches are formed, the micropores would be dissolved by etching. Thus, they do not matter to a mold which is to be finally formed. As appreciated from the above, it is preferred that the time rate change in the voltage is greater than 0.57 V/s and smaller than 20 V/s.

As the interval between the decrease of the voltage from the peak voltage and the start of the next increase of the voltage, it is preferred to set an interval which is necessary for realizing the uniformity of the temperature in the electrolytic solution E0. For example, the interval between the decrease of the voltage from the peak voltage and the start of the next increase of the voltage is preferably set such that the difference in temperature in the electrolytic solution is not more than 2° C. As described above, the electrolytic solution of 4000 L is contained in the anodization bath. Even when the temperature of the solution in a stationary state is measured, there is a variation of about ±2° C. If the difference in temperature between different portions of the electrolytic solution is not more than 2° C., the roughness can be reduced. Note that, by agitating the electrolytic solution E0 in the anodization bath 40, the time required for settling the difference in temperature within a predetermined range can be shortened.

In the above description, the voltage is increased till it reaches the peak value or the target value, although the present invention is not limited to this example. The voltage may be partially flat before it reaches the peak value or the target value. Alternatively, the voltage may partially decrease before it reaches the peak value or the target value.

Even in the case where the supply voltage monotonically increases to the peak value or to the target value, the voltage in a specific region of the mold base S can fluctuate in some cases. For example, even when the voltage applied from the power supply is constant, the effective voltage which is applied to the surface of the mold base largely fluctuates due to the agitation of the electrolytic solution, or the like. For example, the fluctuation of the voltage at the surface of the mold base S is about 5 V.

Figure 32:
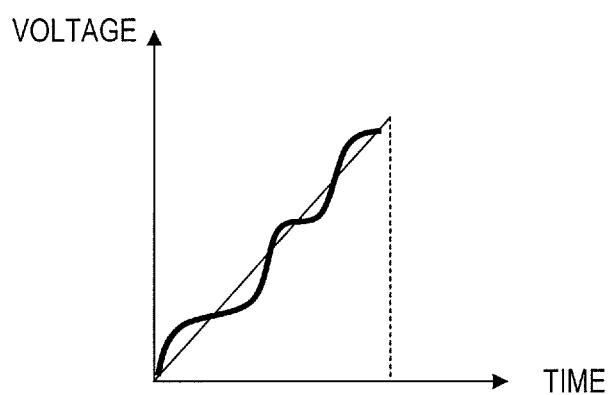
FIG. 32 A graph showing the transition of the voltage in the anodized layer formation method of the present embodiment.

It is supposed that, even when the supply voltage monotonically increases to the peak value or to the target value as shown in FIG. 32, there can be a period during which the voltage applied to the surface of the mold base S is flat due to, for example, the agitation of the electrolytic solution, although it depends on the time rate change in the voltage. For example, in the case where the time rate change in the voltage is 3.2 V/s, when the voltage fluctuates by about 5 V, there is a period of about 1.5 seconds (=5/3.2) during which the voltage is flat. Thus, the voltage applied to the surface of the mold base S has a period of about t=5/a (where a is the time rate change in the voltage) during which the voltage is flat.

In the above description, the slope of the voltage during the increase of the voltage to the first peak value is generally equal to the slope of the voltage during the increase of the voltage to the second peak value, although the present invention is not limited to this example. The slope of the voltage during the increase of the voltage to the first peak value may be different from the slope of the voltage during the increase of the voltage to the second peak value.

Also, in the above description, the slope of the voltage during the increase of the voltage to the peak value is generally equal to the slope of the voltage during the increase of the voltage to the target value, although the present invention is not limited to this example. The slope of the voltage during the increase of the voltage to the peak value may be different from the slope of the voltage during the increase of the voltage to the target value.

In the above description, the time change rate during the increase of the voltage to the peak value or to the target value does not vary, and the slope of the voltage during the increase of the voltage to the peak value or to the target value is constant, although the present invention is not limited to this example. Note that, however, it is preferred that the average time rate change in the voltage which represents the ratio of the peak value to the time during the increase of the voltage to the peak value or to the target value is larger than 0.57 V/s and smaller than 20 V/s.

In the above description, the time rate change in the voltage at the power supply during the increase of the voltage is constant, although the present invention is not limited to this example. For example, consider a case where the voltage is increased twice to the first peak value and to the target value in the anodization step. During the increase of the voltage from a voltage level which is lower than the first peak value to the target value, the time rate change in the voltage from the voltage level which is lower than the first peak value to the first peak value may be set to a maximum value that the power supply can use, and the time rate change in the voltage during the increase from the first peak value to the target value may be set so as to be larger than 0.57 V/s and smaller than 20 V/s. By changing the supply voltage in this fashion, the duration of the anodization can be shortened.

Now, consider a case where the voltage is increased three times to the first peak value, to the second peak value, and to the target value in the anodization step. During the increase of the voltage from a voltage level which is lower than the first peak value to the second peak value, the time rate change in the voltage from the voltage level which is lower than the first peak value to the first peak value may be set to a maximum value that the power supply can use, and the time rate change in the voltage during the increase from the first peak value to the second peak value may be set so as to be larger than 0.57 V/s and smaller than 20 V/s. Likewise, during the increase of the voltage from a voltage level which is lower than the second peak value to the target value, the time rate change in the voltage from the voltage level which is lower than the second peak value to the second peak value may be set to a maximum value that the power supply can use, and the time rate change in the voltage during the increase from the second peak value to the target value may be set so as to be larger than 0.57 V/s and smaller than 20 V/s.

INDUSTRIAL APPLICABILITY

According to the present invention, an anodized layer with reduced variation of recessed portions can be formed.

REFERENCE SIGNS LIST 10 anodized layer
10a barrier layer
10b porous layer
10c porous alumina layer
100 moth-eye mold
100R antireflection element

The invention claimed is:

1. A method for manufacturing a mold which has an inverted moth-eye structure over its surface, the inverted moth-eye structure having a plurality of minute recessed portions whose two-dimensional size viewed in a direction normal to the surface is not less than 10 nm and less than 500 nm, the method, comprising the steps of:
   providing an aluminum film provided on a support or an aluminum base;
   a step of forming a porous alumina layer which has minute recessed portions by means of anodization by applying a voltage between an anode which is electrically coupled to a surface of the aluminum film or the aluminum base and a cathode which is provided in an electrolytic solution with the surface of the aluminum film or the aluminum base being in contact with the electrolytic solution; and
   an etching step after the porous alumina layer is formed, in which the porous alumina layer is brought into contact with an etching solution such that the minute recessed portions are enlarged,
   wherein the step of forming the porous alumina layer by means of anodization includes
   increasing the voltage to a target value, and
   before the voltage is increased to the target value, increasing the voltage to a first peak value which is lower than the target value and thereafter decreasing the voltage to a value which is lower than the first peak value.

2. The method of claim 1, wherein in the step of decreasing the voltage to a value which is lower than the first peak value, the voltage is decreased to substantially zero.

3. The method of claim 1, wherein the step of forming the porous alumina layer by means of anodization further includes, after the step of decreasing the voltage to a value which is lower than the first peak value and before the step of increasing the voltage to the target value, increasing the voltage to a second peak value which is higher than the first peak value and which is equal to or lower than the target value and thereafter decreasing the voltage to a value which is lower than the second peak value.

4. The method of claim 3, wherein in the step of increasing the voltage to the second peak value, the second peak value is generally equal to the target value.

5. The method of claim 1, wherein a time rate change of the voltage in at least a portion of at least one of a period where the voltage is increased to the target value and a period where the voltage is increased to the first peak value is larger than 0.57 V/s and smaller than 20 V/s.

6. The method of claim wherein, in the step of providing, the support or the aluminum base has the shape of a generally circular pole.

7. A method for producing an antireflection element, comprising the step of:
   providing a mold which is manufactured according to the manufacturing method of claim 1 and a work; and
   irradiating a UV-curable resin provided between the mold and a surface of the work with ultraviolet light supplied through the mold, thereby curing the UV-curable resin.

* * * * *